United States Patent

Carter et al.

[15] 3,701,892

[45] Oct. 31, 1972

[54] PARITY CHECKED SHIFT REGISTER COUNTERS

[72] Inventors: William C. Carter, Ridgefield, Conn.; Peter R. Schneider, Yorktown Heights, N.Y.

[73] Assignee: International Business Machines Corporation, Armonk, N.Y.

[22] Filed: Dec. 17, 1970

[21] Appl. No.: 99,083

[52] U.S. Cl........235/153, 235/92 EC, 340/146.1 AG

[51] Int. Cl................................................G06f 11/10

[58] Field of Search.235/153, 92 EC, 92 NG, 92 SH; 340/146.1; 307/223 T

[56] References Cited

UNITED STATES PATENTS

| | | | |
|---|---|---|---|
| 3,163,847 | 12/1964 | O'Connor, Jr. | 340/146.1 |
| 3,176,269 | 3/1965 | Croad, Jr. | 340/146.1 |
| 3,400,367 | 9/1968 | Epstein et al. | 340/146.1 |
| 3,526,758 | 9/1970 | Nozawa | 235/153 |

*Primary Examiner*—Charles E. Atkinson
*Attorney*—Hanifin and Jancin

[57] ABSTRACT

The present invention relates to a family of parity-checked shift register counters having a counting period not determined by a power of 2 wherein the power is determined by the number of shift register stages. It will be apparent that the range of the counter is effected by the number of stages but not necessarily the actual count. The family of counters is further characterized in that either odd or even parity may be designed into the output pattern of said counter, which parity will be automatically maintained for all binary-bit patterns to produce. The family of counters is further characterized in that they require only N+6 logic circuits wherein there are N shift register stages, four 2-input exclusive ORs and 2 N input AND circuits. The counters are also characterized in that they are self testing. That is, all components are tested for faults in normal operations.

17 Claims, 25 Drawing Figures

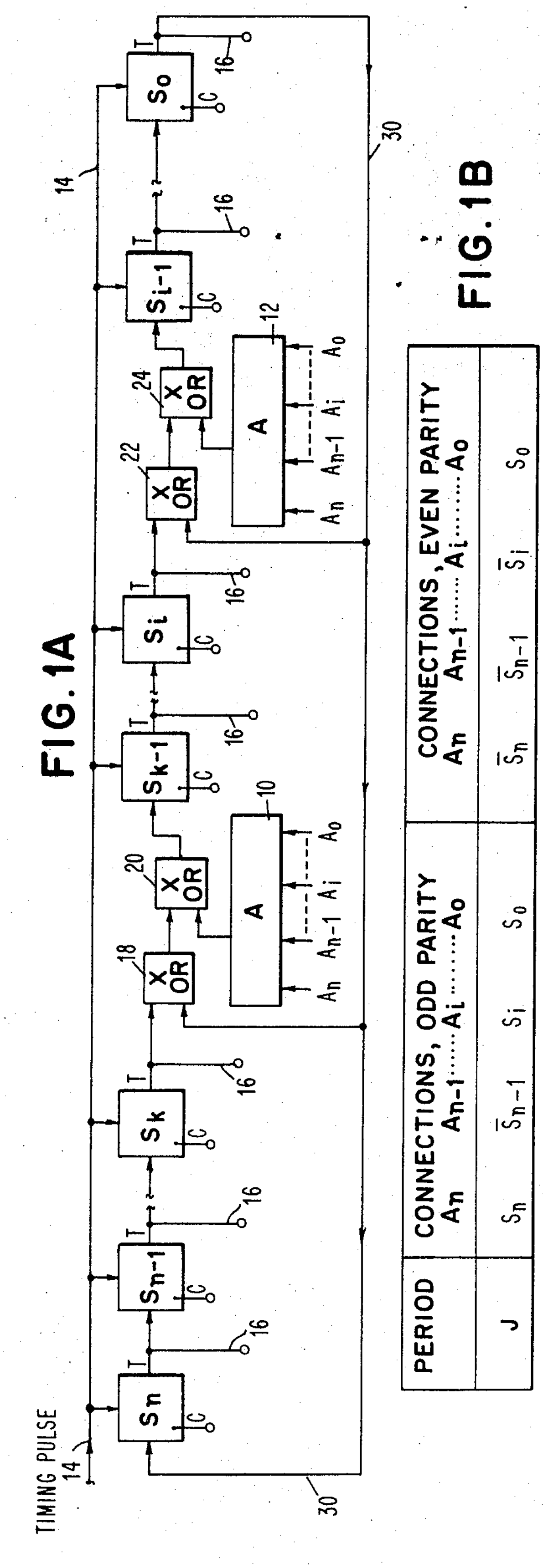

FIG. 1A

FIG. 1B

| PERIOD | CONNECTIONS, ODD PARITY | | | | CONNECTIONS, EVEN PARITY | | | |
|---|---|---|---|---|---|---|---|---|
| | $A_n$ | $A_{n-1}$ | $A_i$ | $A_o$ | $A_n$ | $A_{n-1}$ | $A_i$ | $A_o$ |
| J | $S_n$ | $\bar{S}_{n-1}$ | $S_i$ | $S_o$ | $\bar{S}_n$ | $\bar{S}_{n-1}$ | $\bar{S}_i$ | $S_o$ |

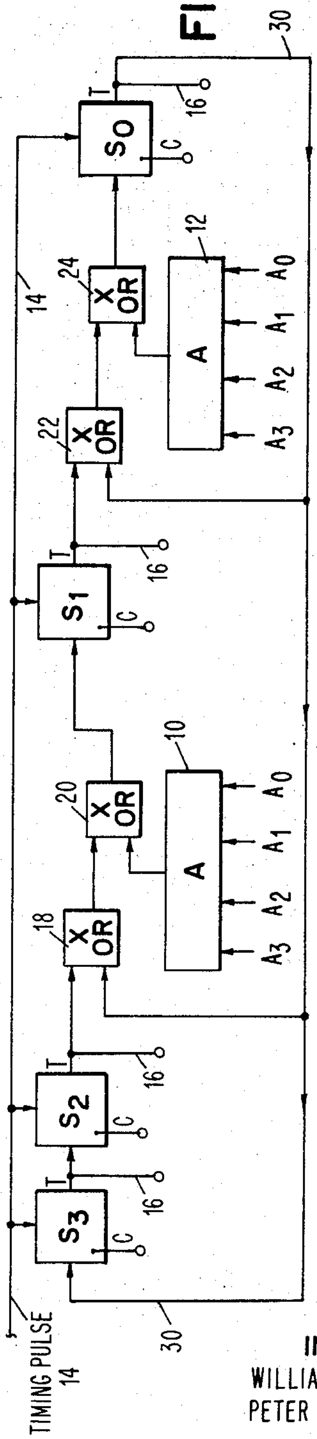

FIG. 2A

FIG. 2B

| PERIOD | CONNECTIONS, ODD PARITY | | | | CONNECTIONS, EVEN PARITY | | | |
|---|---|---|---|---|---|---|---|---|
| J | A3 | A2 | A1 | AO | A3 | A2 | A1 | AO |
| 4 | $\bar{S}_3$ | $\bar{S}_2$ | $\bar{S}_1$ | $S_0$ | $S_3$ | $S_2$ | $\bar{S}_1$ | $\bar{S}_0$ |
| 5 | $S_3$ | $S_2$ | $S_1$ | $\bar{S}_0$ | $\bar{S}_3$ | $\bar{S}_2$ | $S_1$ | $S_0$ |
| 6 | $\bar{S}_3$ | $S_2$ | $\bar{S}_1$ | $\bar{S}_0$ | $S_3$ | $\bar{S}_2$ | $\bar{S}_1$ | $S_0$ |

INVENTORS
WILLIAM C. CARTER
PETER R. SCHNEIDER

BY [signature]
ATTORNEY

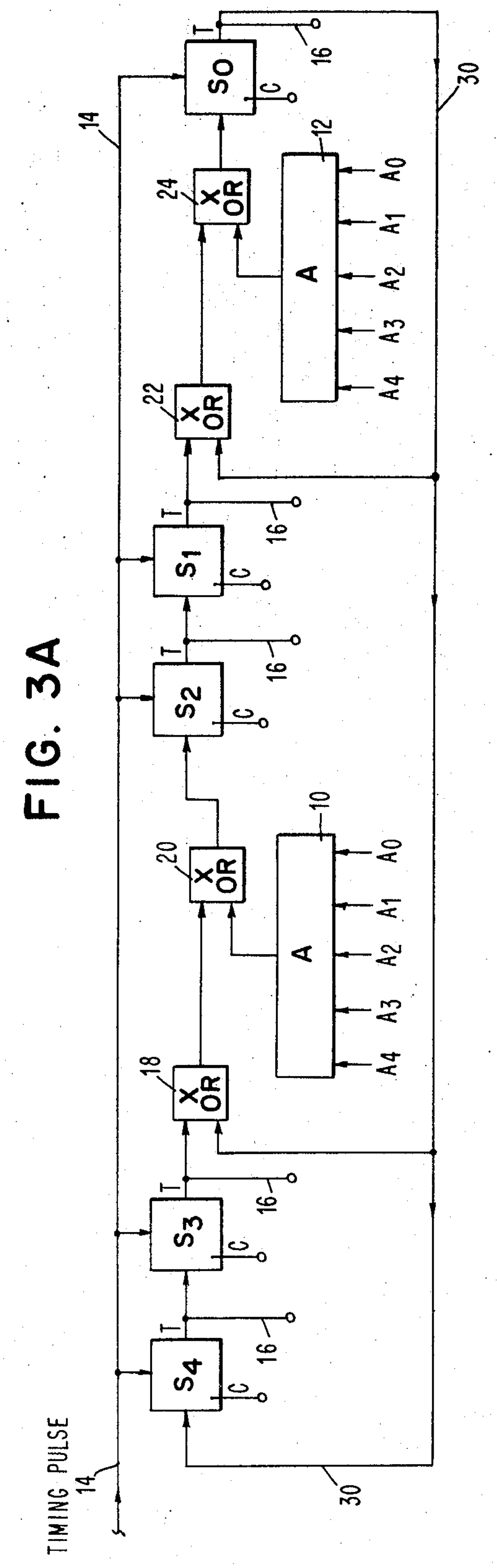

FIG. 3A

| PERIOD J | CONNECTIONS, ODD PARITY | | | | | CONNECTIONS, EVEN PARITY | | | | |
|---|---|---|---|---|---|---|---|---|---|---|
| | $A_4$ | $A_3$ | $A_2$ | $A_1$ | $A_0$ | $A_4$ | $A_3$ | $A_2$ | $A_1$ | $A_0$ |
| 8 | $S_4$ | $\bar{S}_3$ | $\bar{S}_2$ | $\bar{S}_1$ | $\bar{S}_0$ | $\bar{S}_4$ | $S_3$ | $\bar{S}_2$ | $\bar{S}_1$ | $S_0$ |
| 9 | $\bar{S}_4$ | $S_3$ | $S_2$ | $S_1$ | $\bar{S}_0$ | $S_4$ | $\bar{S}_3$ | $S_2$ | $S_1$ | $S_0$ |
| 10 | $\bar{S}_4$ | $S_3$ | $\bar{S}_2$ | $S_1$ | $S_0$ | $S_4$ | $\bar{S}_3$ | $\bar{S}_2$ | $S_1$ | $\bar{S}_0$ |
| 11 | $\bar{S}_4$ | $S_3$ | $S_2$ | $\bar{S}_1$ | $S_0$ | $S_4$ | $\bar{S}_3$ | $S_2$ | $\bar{S}_1$ | $\bar{S}_0$ |
| 12 | $S_4$ | $S_3$ | $S_2$ | $\bar{S}_1$ | $\bar{S}_0$ | $\bar{S}_4$ | $\bar{S}_3$ | $S_2$ | $\bar{S}_1$ | $S_0$ |
| 13 | $\bar{S}_4$ | $S_3$ | $\bar{S}_2$ | $\bar{S}_1$ | $\bar{S}_0$ | $S_4$ | $\bar{S}_3$ | $\bar{S}_2$ | $\bar{S}_1$ | $S_0$ |
| 14 | $S_4$ | $\bar{S}_3$ | $S_2$ | $\bar{S}_1$ | $S_0$ | $\bar{S}_4$ | $S_3$ | $S_2$ | $\bar{S}_1$ | $\bar{S}_0$ |

FIG. 3B

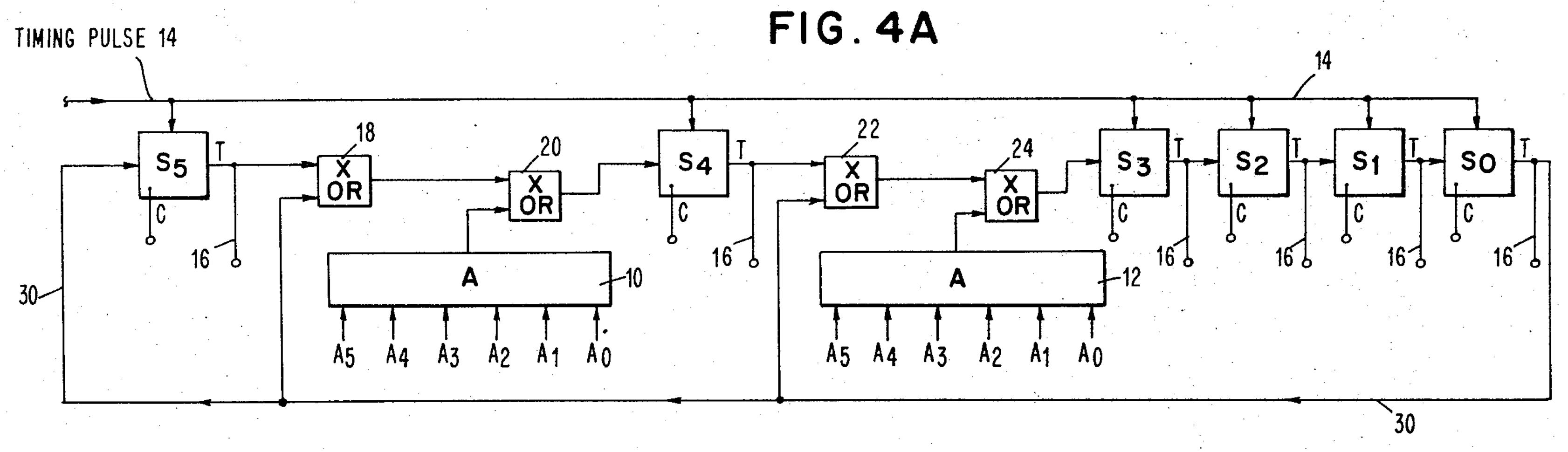

FIG. 4A

FIG. 4B

| PERIOD J | CONNECTIONS, ODD PARITY A5 | A4 | A3 | A2 | A1 | A0 | CONNECTIONS, EVEN PARITY A5 | A4 | A3 | A2 | A1 | A0 |
|---|---|---|---|---|---|---|---|---|---|---|---|---|
| 16 | $\bar{S}_5$ | $\bar{S}_4$ | $S_3$ | $\bar{S}_2$ | $S_1$ | $S_0$ | $S_5$ | $\bar{S}_4$ | $\bar{S}_3$ | $S_2$ | $\bar{S}_1$ | $\bar{S}_0$ |
| 17 | $S_5$ | $\bar{S}_4$ | $S_3$ | $S_2$ | $\bar{S}_1$ | $\bar{S}_0$ | $\bar{S}_5$ | $\bar{S}_4$ | $\bar{S}_3$ | $\bar{S}_2$ | $S_1$ | $S_0$ |
| 20 | $\bar{S}_5$ | $\bar{S}_4$ | $S_3$ | $S_2$ | $S_1$ | $\bar{S}_0$ | $S_5$ | $\bar{S}_4$ | $\bar{S}_3$ | $\bar{S}_2$ | $\bar{S}_1$ | $S_0$ |
| 24 | $S_5$ | $\bar{S}_4$ | $\bar{S}_3$ | $\bar{S}_2$ | $S_1$ | $S_0$ | $\bar{S}_5$ | $\bar{S}_4$ | $S_3$ | $S_2$ | $\bar{S}_1$ | $\bar{S}_0$ |
| 28 | $\bar{S}_5$ | $S_4$ | $\bar{S}_3$ | $S_2$ | $S_1$ | $\bar{S}_0$ | $S_5$ | $S_4$ | $S_3$ | $\bar{S}_2$ | $\bar{S}_1$ | $S_0$ |
| 30 | $S_5$ | $\bar{S}_4$ | $\bar{S}_3$ | $\bar{S}_2$ | $\bar{S}_1$ | $\bar{S}_0$ | $\bar{S}_5$ | $\bar{S}_4$ | $S_3$ | $S_2$ | $S_1$ | $S_0$ |

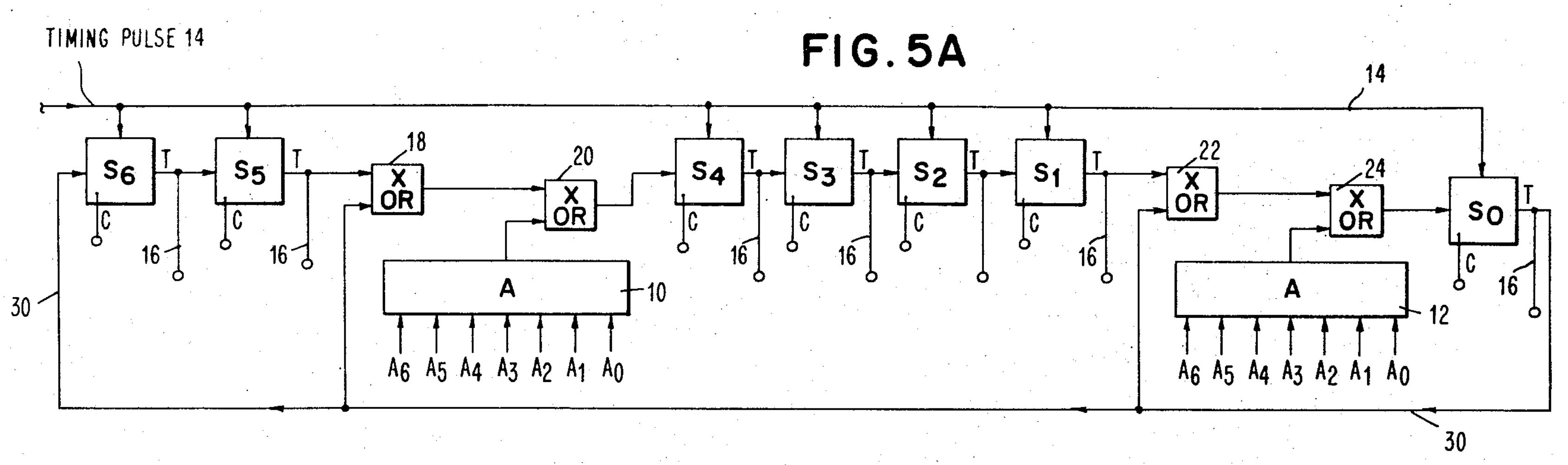

FIG. 5A

FIG. 5B

| PERIOD J | CONNECTIONS, ODD PARITY A6 | A5 | A4 | A3 | A2 | A1 | A0 | CONNECTIONS, EVEN PARITY A6 | A5 | A4 | A3 | A2 | A1 | A0 |
|---|---|---|---|---|---|---|---|---|---|---|---|---|---|---|
| 32 | $\bar{S}_6$ | $\bar{S}_5$ | $S_4$ | $\bar{S}_3$ | $S_2$ | $\bar{S}_1$ | $S_0$ | $S_6$ | $S_5$ | $S_4$ | $\bar{S}_3$ | $S_2$ | $\bar{S}_1$ | $\bar{S}_0$ |
| 38 | $S_6$ | $S_5$ | $S_4$ | $\bar{S}_3$ | $S_2$ | $\bar{S}_1$ | $S_0$ | $\bar{S}_6$ | $\bar{S}_5$ | $S_4$ | $\bar{S}_3$ | $S_2$ | $\bar{S}_1$ | $\bar{S}_0$ |
| 45 | $S_6$ | $\bar{S}_5$ | $\bar{S}_4$ | $\bar{S}_3$ | $S_2$ | $S_1$ | $\bar{S}_0$ | $\bar{S}_6$ | $S_5$ | $\bar{S}_4$ | $\bar{S}_3$ | $S_2$ | $S_1$ | $S_0$ |
| 52 | $S_6$ | $\bar{S}_5$ | $\bar{S}_4$ | $\bar{S}_3$ | $\bar{S}_2$ | $\bar{S}_1$ | $\bar{S}_0$ | $\bar{S}_6$ | $S_5$ | $\bar{S}_4$ | $\bar{S}_3$ | $\bar{S}_2$ | $\bar{S}_1$ | $S_0$ |
| 57 | $\bar{S}_6$ | $S_5$ | $\bar{S}_4$ | $\bar{S}_3$ | $S_2$ | $\bar{S}_1$ | $S_0$ | $S_6$ | $\bar{S}_5$ | $\bar{S}_4$ | $\bar{S}_3$ | $S_2$ | $\bar{S}_1$ | $\bar{S}_0$ |
| 62 | $S_6$ | $\bar{S}_5$ | $S_4$ | $S_3$ | $S_2$ | $\bar{S}_1$ | $S_0$ | $\bar{S}_6$ | $S_5$ | $S_4$ | $S_3$ | $S_2$ | $\bar{S}_1$ | $\bar{S}_0$ |

| PERIOD J | CONNECTIONS, ODD PARITY A7 | A6 | A5 | A4 | A3 | A2 | A1 | A0 | CONNECTIONS, EVEN PARITY A7 | A6 | A5 | A4 | A3 | A2 | A1 | A0 |
|---|---|---|---|---|---|---|---|---|---|---|---|---|---|---|---|---|
| 64 | $\bar{S}_7$ | $\bar{S}_6$ | $S_5$ | $\bar{S}_4$ | $\bar{S}_3$ | $\bar{S}_2$ | $\bar{S}_1$ | $S_0$ | $S_7$ | $S_6$ | $\bar{S}_5$ | $S_4$ | $S_3$ | $\bar{S}_2$ | $\bar{S}_1$ | $\bar{S}_0$ |
| 73 | $\bar{S}_7$ | $\bar{S}_6$ | $S_5$ | $S_4$ | $S_3$ | $S_2$ | $S_1$ | $\bar{S}_0$ | $S_7$ | $S_6$ | $\bar{S}_5$ | $\bar{S}_4$ | $S_3$ | $S_2$ | $S_1$ | $S_0$ |

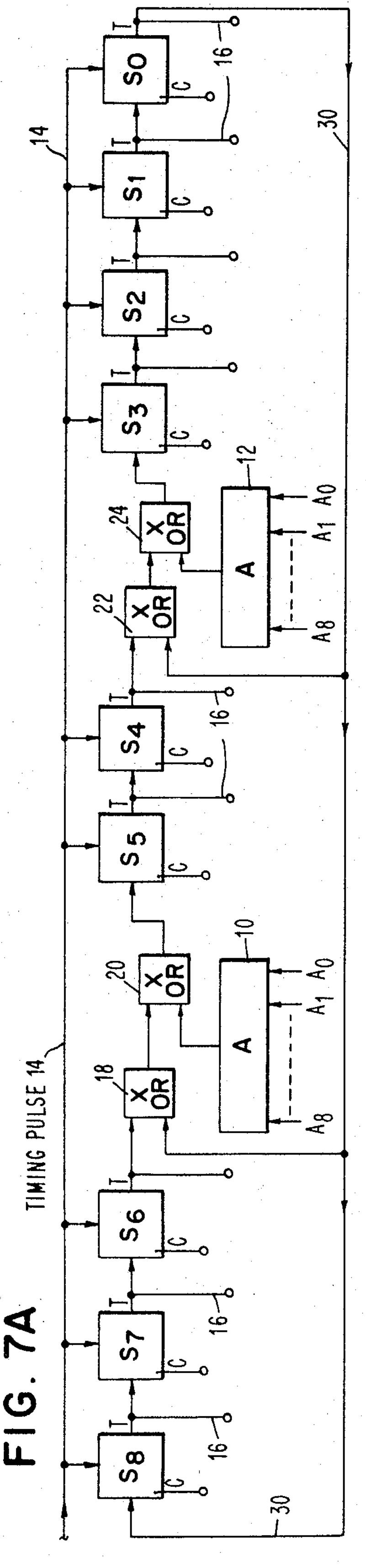
FIG. 7A
| PERIOD J | CONNECTIONS, ODD PARITY | | | | | | | | | CONNECTIONS, EVEN PARITY | | | | | | | | |
|---|---|---|---|---|---|---|---|---|---|---|---|---|---|---|---|---|---|---|
| | A8 | A7 | A6 | A5 | A4 | A3 | A2 | A1 | A0 | A8 | A7 | A6 | A5 | A4 | A3 | A2 | A1 | A0 |
| 128 | S8 | S7 | S6 | S5 | $\bar{S}4$ | S3 | $\bar{S}2$ | $\bar{S}1$ | $\bar{S}0$ | $\bar{S}8$ | $\bar{S}7$ | $\bar{S}6$ | S5 | $\bar{S}4$ | $\bar{S}3$ | S2 | S1 | S0 |
FIG. 7B
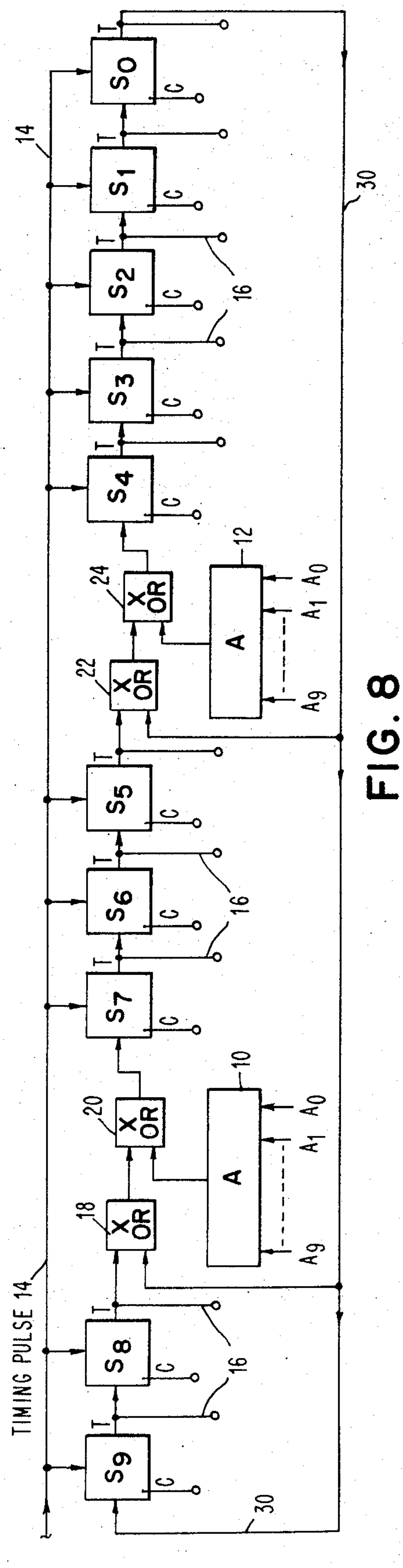
FIG. 8

PARITY CHECKED SHIFT REGISTER COUNTERS

BACKGROUND OF THE INVENTION

There are many applications in the present day electronics industry where counters or counting circuits perform necessary control functions. In the computer industry in general, counters are widely used in electronic computers to perform various types of control functions. Such counters may obviously be utilized for the purpose of counting pulses or outputs for some particular source where a given output is produced to essentially give a branch on condition type of operation. Such counters may also be utilized simply to produce recurrent series of binary pulse groups or words which may in turn be fed to decoders, the outputs of which are in turn sent to various functional blocks of the computing system.

Counters classically fall into one of two catagories. The first is a digital counter wherein the logic necessary is supplied so that the counter will produce a binary output pattern which progresses in an ascending digital order, i.e., 0, 1, 2, 3, 4, 5, etc. up to some maximum count period at which point it will reset to 0. Another widely used type of counter is one which simply produces a recurrent series of binary patterns which patterns have no bearing on a digital order, either ascending or descending. However, the recurrence of patterns is fixed up to some maximum count period and, for example, the fourth pattern produced in a given count period would always be the same. As will be apparent, decoders can be designed for this type of counter just as readily as with a digital counter and, in fact, this sort of counter is most often used in internal portions of a computer for an actual knowledge of a digital count is not necessary but only that a fixed pattern of "1's" and "0's" be recognizable by a decoder.

The present invention deals with non-decimal counters and more specifically with those of the shift register type. The present shift register counters have the advantage that they use minimal logic circuitry and the counter delay is independent of the counter length when the counter, i.e., the number of register stages, is long.

A major problem with counters in the past as well as with most of the active components of any computer organization, is that of accuracy or error detection. A number of prior schemes have been utilized in the past to detect an error in the operation of a counter. One such prior art counter involves the use of two substantially identical counters and the test merely involves comparing the outputs. Other systems utilized in the past detect errors in the operation of the counter by recognition circuitry for ascertaining that at least one stage of the counter is operated at any time an incoming pulse is received. In such a system, as long as at least one stage operates, it is assumed that the counter is operating correctly.

A widely used technique for determining correct operation of a counter or any other major functional unit of the computing system is known as parity coding. By this technique, a certain amount of redundancy is introduced into the coded data produced by such a functional unit being tested so that at least single errors will be evidenced. The simplest and most common redundancy technique as stated previously is the use of a parity bit. By this technique, a single binary bit may be selectively set to a "1" or a "0" depending upon whether or not the total number of "1's" in a given group of binary bits is to be maintained "odd" or "even." This additional binary bit is commonly known as a parity bit. For a more detailed description of such coding techniques, reference is made to an article by R.W. Hamming entitled "Error Detecting and Error Correcting Coes" in the Bell System Technical Journal, Vol. 29, pages 147–160, April 1950.

Shift register counters have been designed in the past to count to some number less than an exact power of 2 wherein the power is determined by the number of stages of the counter. Similarly, it is known in the art to utilize an additional stage in the counter wherein the parity of the output of the counter may always be maintained at a desired odd or even level. However, no one has succeeded in the past in designing a shift register counter capable of counting to some point or period J less than the power of two of the actual number of counter stages and also capable of maintaining correct parity, either odd or even, in the counter output and which will further detect failures in the shift register stages and feedback circuitry. The versatility and saving in the circuit cost of such a counter are thought to be obvious.

SUMMARY AND OBJECTS

It has now been found that it is possible to design a family of parity encoded shift register counters which may be designed to have any period J lying between $2^{N-2}$ and $2^{N-1}$–2. In this formula, $N$ represents the number of stages of the basic unencoded shift register circuitry. Desired odd or even parity is automatically compensated for and all of the counter outputs will maintain the desired parity for all outputs throughout the count. The complete family of counters is characterized by having a minimum amount of logic circuitry in addition to the actual shift register stages. The counter thus obtained has the versatility of being designable for any count period J and also is automatically self testing in that any single circuit failure will produce a parity error.

It is accordingly a primary object of the present invention to provide shift register counters having a natural count period which is not directly related to a power of 2.

It is another object to provide such counters which automatically provide a fixed parity output.

It is yet another object to provide such counters wherein said predetermined parity is maintained and wherein there is no predetermined parity bit position.

It is a still further object to provide such counters which are inherently self testing.

It is a still further object to provide such counters having a minimum of logic circuitry in addition to the shift register stages.

It is yet another object to provide such counters requiring a maximum of two N-input AND gates and a maximum of six exclusive-OR circuits in addition to the N shift register stages.

It is a still further object to produce such a circuit wherein the majority of said counters require only 4–2 input exclusive-OR circuits in addition to the two AND circuits and the shift register stages.

Other objects, features, and advantages of the invention will be apparent from the following more particular description of the preferred embodiments of the invention, as illustrated in the accompanying drawings.

DESCRIPTION OF THE DRAWINGS

FIG. 1A comprises a logical schematic diagram of a generic form of the shift register counter of the present invention.

FIG. 1B comprises a connection table specifying the inputs to the two AND circuits in FIG. A.

FIG. 2A comprises a logical schematic diagram for a four-stage shift register counter incorporating the teaching of the present invention.

FIG. 2B comprises a connection diagram indicating the inputs to the two AND circuits of FIG. 2A.

FIG. 3A comprises a logical schematic diagram of a five-stage shift register counter constructed in accordance with the teachings of the present invention.

FIG. 3B comprises a wiring diagram illustrating the inputs 4, the two AND gates of FIGS. 3A.

FIG. 4A comprises a logical schematic diagram of a six-stage shift register counter constructed in accordance with the teachings of the present invention.

FIG. 4B comprises a wiring diagram illustrating the specific inputs to the two AND circuits of FIG. 4A.

FIG. 5A comprises a logical schematic diagram of a seven-stage shift register constructed according to the principles of the present invention.

FIG. 5B comprises a wiring diagram specifying the inputs to the two AND gates of FIG. 5A.

FIG. 7A comprises a logical schematic diagram of a nine-stage shift register counter constructed in accordance with the principles of the present invention.

FIG. 7B comprises a wiring diagram showing the inputs to the two AND gates of FIG. 7A for one counter.

FIG. 8 comprises a logical schematic diagram for a 10-stage shift register counter constructed in accordance with the principles of the present invention.

DESCRIPTION OF THE EMBODIMENT

Figures 6A, 6B:
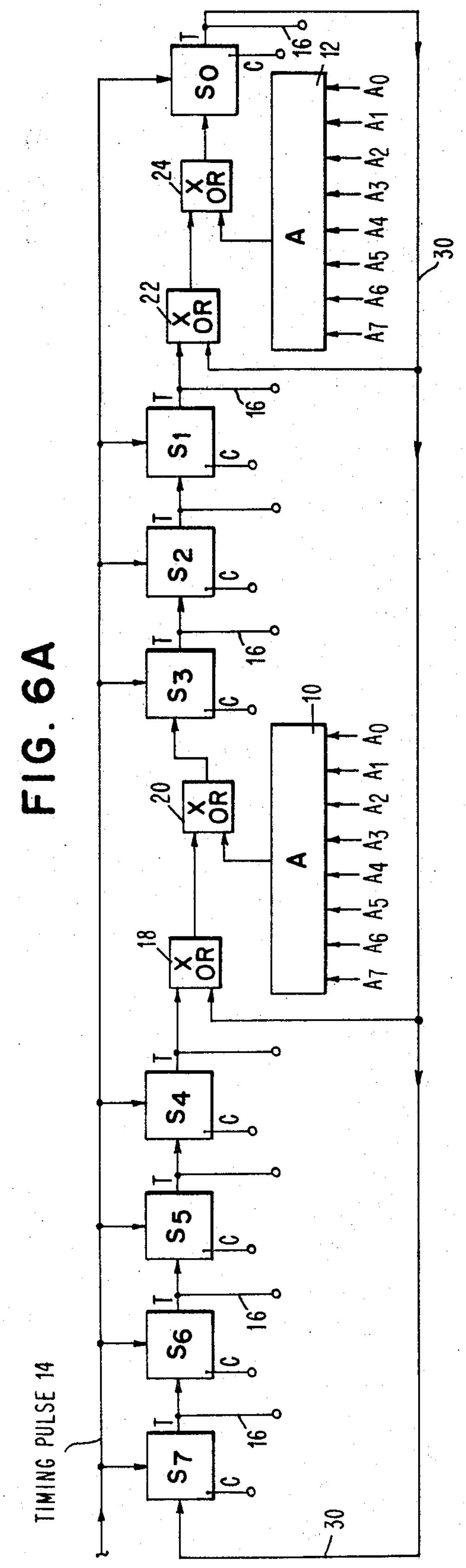
FIG. 6A comprises a logical schematic diagram for an eight-stage shift register constructed in accordance with the principles of the present invention.
FIG. 6B comprises a wiring diagram illustrating the inputs to the AND gates of FIG. 6A for two different counter periods.
Figure 9:
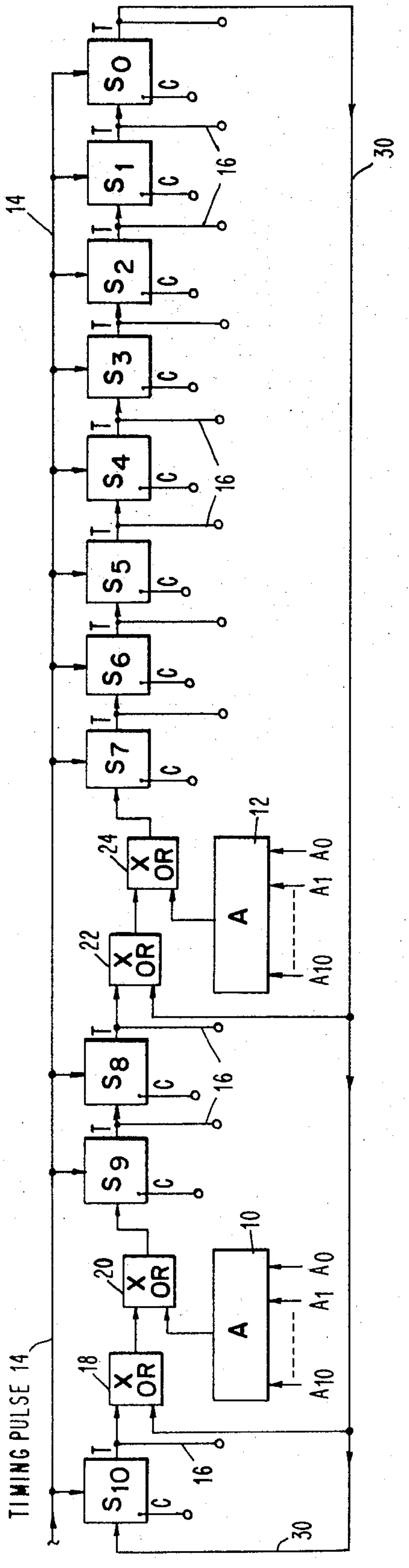
FIG. 9 comprises a logical schematic diagram for an 11-stage shift register counter constructed in accordance with the principles of the present invention.
Figure 10:
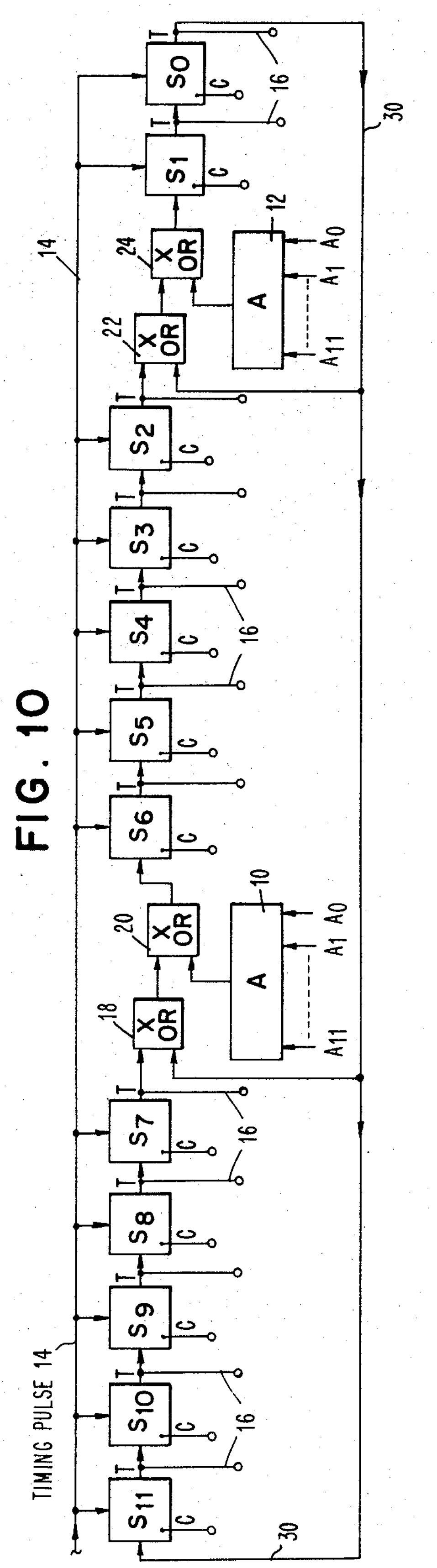
FIG. 10 comprises a logical schematic diagram for a 12-stage shift register counter constructed in accordance with the principles of the present invention.

The objects of the present invention are accomplished in general by a family of fixed parity shift register counters having no fixed parity bits. Said counters are adaptable for counting to a number J, which may be chosen to lie between $2^{N-2}$ and $2^{N-1}-2$, wherein said counter comprises N counter stages and produces an output of N=1 binary bits. The stages are conventionally identified as $S_N$ to $S_O$ wherein $n=N-1$ and the output of the $i^{th}$ stage is connected to the $(i-1)^{th}$ stage. A first exception is the $j^{th}$ stage, whose output is exclusive-ORed with the output of stage $S_O$ and that output is exclusive-ORed with the output of a first AND circuit, which has an input from each shift register stage selected from the true and complement outputs of each such stage, said selection being directly determinable from a fixed logic mapping table having the specific count (value of J) and parity as inputs to the mapping table. The output of said second exclusive-OR provides an input to the $(j-1)$ stage. A second exception is the $k^{th}$ stage whose output is exclusive-ORed with the output of stage $S_O$ and that output exclusive-ORed with the output of a second AND circuit which has an input from each shift-register stage selected from the true and complement outputs of each stage, said selection being the same as for said first AND circuit, and wherein the output of stage $S_O$ provides the input to stage $S_n$.

For each form of the presently disclosed set of counters, the exact location of the $j^{th}$ and $k^{th}$ stages will vary as will be apparent from the subsequent description. However, the basic configuration of the circuitry inserted between these stages is identical, i.e., two exclusive-ORs and an AND circuit. This counter configuration holds true for all counters wherein the number of stages varies from three to 20. The only slight exception to this configuration is the counter shown in FIG. 11 wherein two additional exclusive-OR circuits are located between the sixth and seventh stages and the fifth and sixth stages respectively, said exclusive-ORs having as their second inputs the output from the stage $S_O$.

For a given counter, i.e., one having $N$ stages, the basic configuration, i.e., the location of the exclusive-OR circuits and the two N-input AND circuits remain the same regardless of which value of counter period (J) is chosen between $2^{N-2}$ and $2^{N-1}-2$ is chosen. The only variation in this family of counters for the different values of J will be the specific connections, i.e., $A_n$ to $A_O$, necessitated by the particular count being chosen. The specific connections may be obtained by utilizing the shift register counter connection matrix algorithm disclosed subsequently.

In the subsequent description of the present counters, examples will be given for the connections to be utilized for various count periods as well as examples of the actual output code produced by a typical shift register counter constructed in accordance with the teachings of the present invention.

As stated previously, it should be remembered that the present counters are not intended to be digital counters, nor is there any digital relationship in their output. However, as will be well understood, decoders for the outputs of such counters may be readily constructed and normally require only a single multiple input AND gate to determine if the counter is producing a binary pattern recognizable by said decoder.

A counter constructed in accordance with the teachings of the present invention would normally be utilized to produce a fixed series of binary patterns in accordance with the output of some activating pulse source and would not normally be utilized to count events as such. However, there is no reason why such a function could not equally well be performed by the present family of counters when suitably provided with activating circuitry and decoders.

An extremely important feature of the present family of counters is the fact that they may be designed to produce a series of code patterns which always maintain a fixed parity either odd or even. However, once designed, the counter, as long as it is operating properly, will always produce odd or even parity and is self testing. Thus, its operation may readily be checked for a single error condition.

Utilizing the teachings of the present invention, a counter may be designed utilizing minimum circuitry for producing a count of any desired period J. As stated previously, this count need not be limited by some power of 2. Further, the desired parity may be specified and a resultant counter constructed utilizing an absolute minimum of logic circuitry.

The basic structural component or major assembly of the presently disclosed family of shift register counters is of course the basic shift register circuitry. As is well known in the art, in a basic shift register, assuming that the shift register is initially loaded with some information or reset all O's or all 1's, each time a set of shifting pulses is applied to the register, the information is shifted between adjacent stages. That is a binary 1 or a binary 0 currently existing in one stage will be shifted one bit position either to the right or the left, depending upon the direction of shifting of the particular register. With conventional shift registers, input data can be brought in a bit at a time at one end and shifted out a bit at a time at the other end or conversely, one end may be connected back to the other end to form a ring type circuit. With the present shift register counter, as will be apparent from the subsequent description, the register is initially loaded with an initializing pattern obtained during the design stage for the counter and starting with the initial bit pattern, bits will be directly propagated from one stage to the next with the exception of certain inter-stage connections where the previously mentioned exclusive-OR and AND circuits modify the data. Also, the output of the last stage in the shifting cycle is directly connected to the first stage and, this output is also utilized as inputs into the aforementioned logic circuit.

A shift register suitable for use with the present invention could be constructed of any number of different types of components. For example, the actual stages themselves could be essentially magnetic in nature, utilizing biaxial magnetic cores as is well known, or they could be tube or transistor varieties. For a general description of shift registers well known in the art, reference is made to the book by R.K. Richards entitled, "Digital Computers, Components and Circuits," published by D. VanNostrand and Co., New York 1957. There are descriptions of a number of different types of shift registers and other shifting circuits contained in this volume which are readily accessable by referring to the index.

Another form of shift register, which would be suitable for use with the present invention is constructed of field-effect transistors and is described in U.S. Pat. No. 3,461,312, entitled "Field-Effect Transistor Shift Register" of Farber et al. dated Aug. 12, 1969.

Obviously, the exclusive-OR and AND circuits, comprising the essential logic of the present invention, which is added to such a shift register, would have to be compatible, i.e., they would have to operate with the signal and impedance levels of the shift register circuitry both for input and output purposes. However, this is well within the knowledge of a person skilled in the art.

Similarly, when reference is made to a shifting pulse, it should be understood that it refers to the necessary sequence of pulses to perform the required single shift operation. This might be two-phase or four-phase, depending upon the particular type of shift register being utilized. Thus, it should be understood that when the term "the shifting pulse" is utilized, it is intended to refer to the particular form of pulse stream necessary whether it be single or multiple.

The invention will now be specifically pointed out and described with reference to the accompanying figures. In these figures, the actual storage elements or shift register stages are labeled $S_0, S_1, \ldots S_n$. Thus, for a total number of storage elements or stages N, the accompanying stages would be labeled $S_0 \ldots S_n$, wherein n equals $N-1$ in all of these figures in the description. Also, in all of the counters, the $i^{th}$ stage output feeds the input of the $(i-1)^{th}$ stage. The output of the stage $S_0$ always feeds back to the input of the stage $S_n$. Again, this particular designation is for convenience, it being noted that the order of subscripting could just as well be reversed.

The period of all of the counters disclosed is indicated by J. For each period J, there will be a different set of inputs to the AND gates for any individual counter configuration of $N$ stages. Obviously, when the number of stages ($N$) varies, not only will the inputs to the AND gates vary, but also the location of the AND gates and exclusive-OR gates.

The inputs to both AND gates for each series of counters is always the same for a given value of J. In other words, referring to AND gate 10 in FIG. 1A and AND gate 12, all of the inputs $A_n \ldots A_0$ are the same for any given period J. The inputs to each of the AND gates is obtained directly from the output of the individual shift register stages. The input to the AND gate is selected from the true or complement of the current setting of the stage, depending upon the requirements as obtained from the shift register counter connection matrix algorithm for the counter which will be described subsequently, and clearly shown in the accompanying connection tables. It will thus be seen that each stage has an output labeled $t$ for true and $c$ for complement. Thus, if a given stage is set to a 1, the true output would in turn be a 1 and the complementary output would be a 0 and vice versa. The timing pulse shift source is shown as line 14 on FIG. 1A and as indicated previously, depending upon the particular type of shift registers being utilized, this would comprise a single pulse or a pulse train comprising 1, 2, 4 or more pulses as will be readily appreciated by those skilled in the art. Looking generally at the shift register counter of FIG. 1A, it will be noted that each time a timing or shift pulse is received, the binary setting of each stage will be propagated to the stage immediately to the right thereof (in the present embodiment) with the exception of those stages which are separated by the two exclusive-OR circuits and the AND circuit. As will be further appreciated, the output from the counter would be taken from the output lines labeled 16 from each stage which are connected to the true output of the stage at any given time reference.

FIG. 1B illustrates in tabular form, the relationship of the outputs of the individual shift register stages S to the inputs to the AND circuits 10 and 12. Further, it will be noted that different inputs are indicated depending on whether odd parity or even parity is desired. Thus, each input $A_i$ is obtained from the corresponding counter stage $S_i$. Whether this input $A_i$ is the true or the complement, depends upon the results of the mapping logic necessary to produce the desired count J and parity. It should be further noted, however, that the inputs to both the AND circuits, i.e., 10 and 12, are the same in any given counter designed for a given count J and a desired parity. It should be understood, that the particular contents of the table in FIG. 1B only intended to be exemplary of the generic form of such a counter shown in FIG. 1A and actually have no bearing upon any given counter configuration. They are intended to be exemplary only of the fact that the inputs vary for conditions of odd and even parity even with the same count period J. In subsequent figures, the actual connections shown in the connection tables will be specific for a particular count and for a particular parity condition.

Referring now to FIG. 2A, there is shown a shift register counter having a total of four stages. The two AND gates 10 and 12 have four inputs from $A_0$ to $A_3$ and their outputs produce one input to the two exclusive-OR circuits 20 and 24. In this particular configuration, it will be noted that the AND gate 10 and the two exclusive-OR circuits 18 and 20 are connected between stages $S_2$ and $S_1$ and that the AND circuit 12 is connected between the stages $S_1$ and $S_0$.

It will be noted that the output of $S_3$ is directly connected to the input of $S_2$ as with a normal shift register. The output of $S_0$ is brought around and connected back to the input of $S_3$ and also provides one of the inputs to the two exclusive-OR circuits 18 and 22. As will be observed, these two outputs provide an input respectively to the exclusive-OR circuits 20 and 24. Thus, FIG. 2A discloses the basic circuit configuration for a four-stage shift register having the characteristics previously described of being designable to produce a desired count period J, be self testing and maintain a fixed parity whether odd or even.

Referring now to FIG. 2a connection diagram is shown as required for the various count periods J or to obtain the particular parities described. It is believed that the contents of this table are clear and unambiguous. It will be noted that across the top, the inputs to the two AND circuits 10 and 12 are labeled $A_3$, $A_2$, $A_1$ and $A_0$ and this is repeated once for odd parity and once for even parity. In referring to the left-hand column, the count periods 4, 5 and 6 are shown, and then in the adjoining rows, the proper connections to the shift register stages are indicated. Thus, to obtain odd parity for a count period of 4, line $A_3$ in both AND circuits would be connected to the complement output of stage $S_3$. Similarly, lines $A_2$ would be connected to the complement outputs for stages $S_2$ and $S_1$. However, the connection to line $A_0$ would be connected to the true output of stage $S_0$. Similarly, for a count period of four, but with even parity, the lines $A_3$ and $A_2$ would be connected to the true output of stages $S_3$ and $S_2$ respectively, and the lines $A_1$ and $A_0$ would be connected to the complement outputs of the stages $S_1$ and $S_0$. The same connection convention is utilized throughout this connection diagram and also the other connection diagrams indicated as FIGS. 3B, 4B, 5B, 6B and 7B.

Table I below shows the actual counter output for a counter designed to produce a count period of J=5 and for producing odd parity. In the bit patterns shown, it will be noticed that in time periods 1–5 all of the patterns are different and that they all maintain odd parity, i.e., an odd number of binary "1's." It will then be seen that in time period 6, the same bit pattern is produced as in time period 1. As will be readily understood, the counter will continue to cycle through the binary-bit pattern shown in Table II. It should be understood clearly that the initial loading of the registers is produced by the previously referenced shift register counter connection matrix algorithm. It will be apparent that any time it is desired to stop one of these counters on a count other than 5, and it is desired that the counter be initialized, it would be necessary to reload the counter with the initial register contents as shown in time period 1. This is true for all of the counters of the present system. Normally, it would be expected that the counters would stop at the upper limit during normal operation of the machine, but in the case of machine interrupts, power failures and the like, it is possible that it might be necessary to initialize such a counter again. This would of course have to be done by utilizing some memory storage facility for storing the particular initializing condition for the counter and accessing it whenever it becomes necessary to reload the counter stages.

TABLE I

| Time Period | S3 | S2 | S1 | S0 | | |
|---|---|---|---|---|---|---|
| 1 | 1 | 1 | 1 | 0 | | |
| 2 | 0 | 1 | 0 | 0 | | period |
| 3 | 0 | 0 | 1 | 0 | 5 | |
| 4 | 0 | 0 | 0 | 1 | | |
| 5 | 1 | 0 | 1 | 1 | | |
| 6 | 1 | 1 | 1 | 0 | | |

Referring now to FIG. 3A, a counter is shown wherein a total of five counter stages are utilized and in this case, the AND circuits 10 and 12 and the associated exclusive-OR circuits 18, 20, 22 and 24 are located between the stages $S_3$ and $S_2$ and stages $S_1$ and $S_0$ respectively. As will be apparent, this particular circuit configuration will handle any count periods J from 8 through 14. The other connections and the operation of the system is identical as with the counter of FIG. 2A. It being understood that the particular connections for $A_4$ through $A_0$ for any given period J will have to be determined from the connection matrix algorithm or be taken directly from the connections shown in FIG. 3B for the particular values of J which have been evaluated there.

FIG. 3B is identical to FIG. 2B in that it specifies the exact connections for the AND circuits 10 and 12 to produce the required count period and parity as indicated in the drawing. The not symbol or bar (‾) appearing over any of the members S obviously means that the complement output of that particular stage is to be taken rather than the true output. It should be clearly understood of course, that once the count period and parity are fixed, that it is never necessary to change any of these connections since the true or complement value of a particular shift register stage will always be produced on an output line whether the complement is a binary 1 or a 0.

Table II below illustrates the specific bit patterns produced by the five-stage counter of FIG. 3A when said counter is connected to produce a count of J=12 and odd parity. As will be apparent by referring to FIG. 3B, the connections to the AND circuits 10 and 12, lines $A_4$, $A_3$ and $A_2$ would be connected to the true output of the stages $S_4$, $S_3$ and $S_2$ and lines $A_1$ and $A_0$ would be connected to the complement outputs for the stages $S_1$ and $S_0$.

TABLE II

| Time Period | S4 | S3 | $S_2$ | $S_1$ | $S_0$ | |
|---|---|---|---|---|---|---|
| 1 | 1 | 1 | 1 | 0 | 0 | |
| 2 | 0 | 1 | 0 | 1 | 1 | |
| 3 | 1 | 0 | 0 | 0 | 0 | |
| 4 | 0 | 1 | 0 | 0 | 0 | |
| 5 | 0 | 0 | 1 | 0 | 0 | period |
| 6 | 0 | 0 | 0 | 1 | 0 | 12 |
| 7 | 0 | 0 | 0 | 0 | 1 | |
| 8 | 1 | 0 | 1 | 0 | 1 | |
| 9 | 1 | 1 | 1 | 1 | 1 | |
| 10 | 1 | 1 | 0 | 1 | 0 | |
| 11 | 0 | 1 | 1 | 0 | 1 | |
| 12 | 1 | 0 | 0 | 1 | 1 | |
| 13 | 1 | 1 | 1 | 0 | 0 | |

FIGS. 4A and 4B are essentially the same as FIGS. 3A and 3B except that in this case, a six-stage shift register counter is shown. However, it will be readily appreciated that the two AND circuits 10 and 12, each have six inputs $A_5$ through $A_0$. The four exclusive-OR circuits and all of the other logic circuitry perform in exactly the same manner as with previous examples.

FIG. 4B again shows a connection matrix for the counter of FIG. 4A for various periods J from 16 to 30 and for conditions of odd or even parity. The conventions utilized in all of these connection diagrams of FIGS. 1B through 7B are exactly the same insofar as they specify whether for a particular period and parity the true or complement output of the various shift register stages is to be fed into the inputs to the AND circuits 10 and 12.

FIGS. 5A, 5B, 6A, and 6B, 7A and 7B are all similar to the previous groups of FIGS. wherein the shift register counter per se is shown in the A FIG. and the connection diagram for selected counter periods is shown in the B FIGS. For all of these counters, it is again noted that there are four exclusive-OR circuits, 18, 20, 22 and 24 and the two AND circuits 10 and 12. The feedback line 30 and the timing pulse line 14 similarly appears in all of the FIGS. and performs in exactly the same way for all of the different counters.

Figure 18:
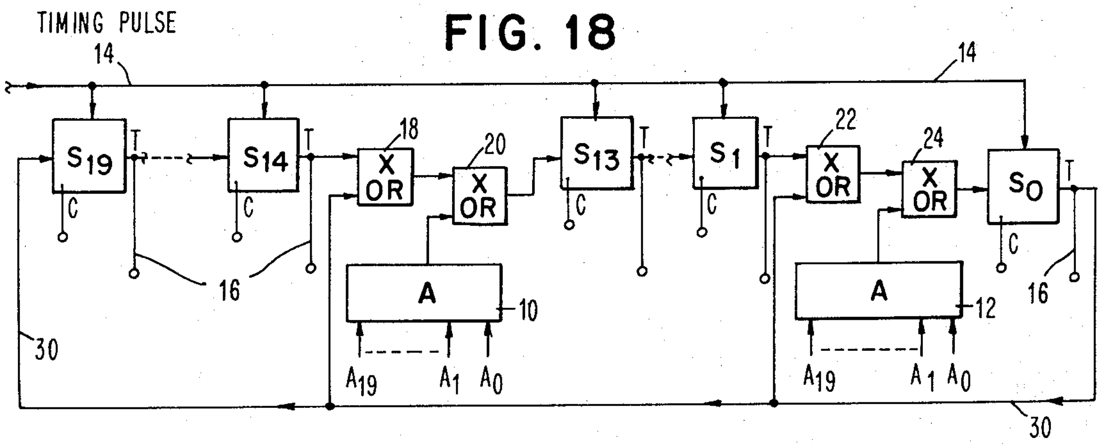
FIG. 18 comprises a logical schematic diagram for a 20-stage shift register counter constructed in accordance with the principles of the present invention.

Thus, there will be no specific description of FIGS. 8 through 18 (except FIG. 11) which cover those forms of counters between the ranges of 10 shift register stages and 20 shift register stages. As will be apparent, the 20 shift register stage counter as shown in FIG. 18 is capable of producing a number of different binary patterns as large as 524,286. As will be readily appreciated, this gives an extremely wide range of counting periods, in fact, as many as it is thought would be desired in most systems. It should be noted, however, that the teachings of the present invention could be extended to counters of length even greater than N=20.

However, the algorithm for designing each new counter family, (i.e., a larger value of N) is complex and it is believed that the specific circuits disclosed herein up to the range of *N*=20 is adequate to cover virtually all situations which would be encountered by a design engineer wishing to produce such a counter.

Figure 11:
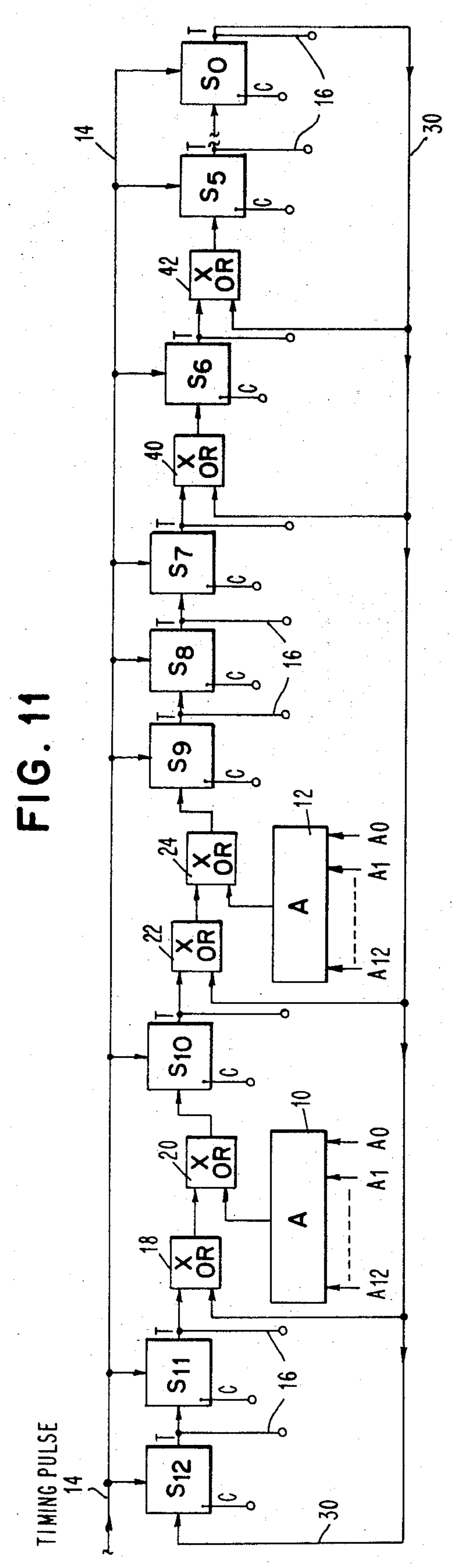
FIG. 11 comprises a logical schematic diagram for a 13-stage shift register counter constructed in accordance with the principles of the present invention.
Figure 12:
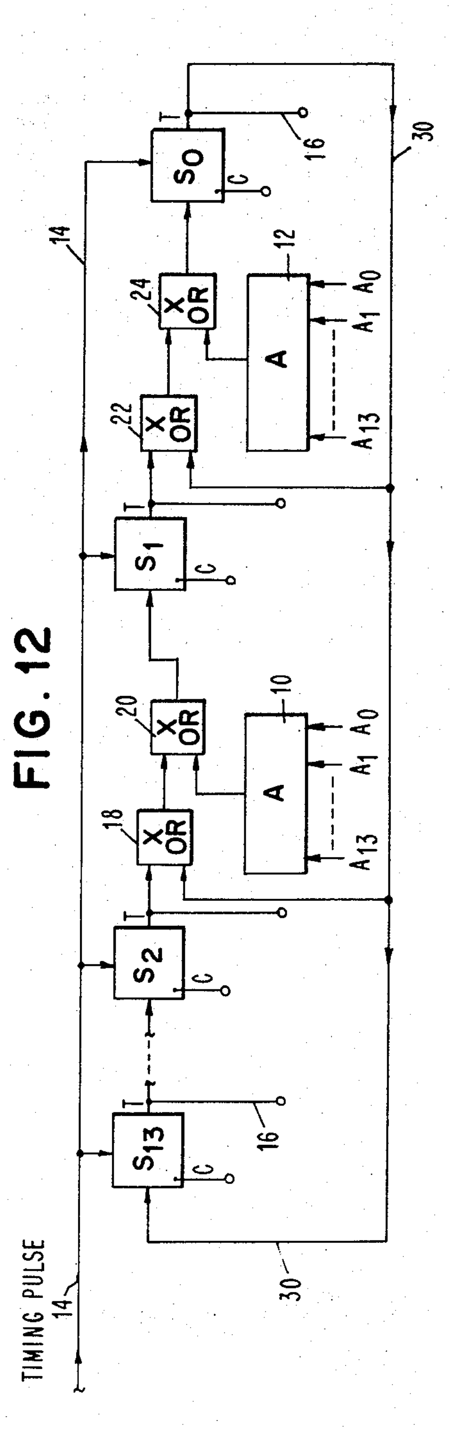
FIG. 12 comprises a logical schematic diagram for a 14-stage shift register counter constructed in accordance wit the principles of the present invention.
Figure 13:
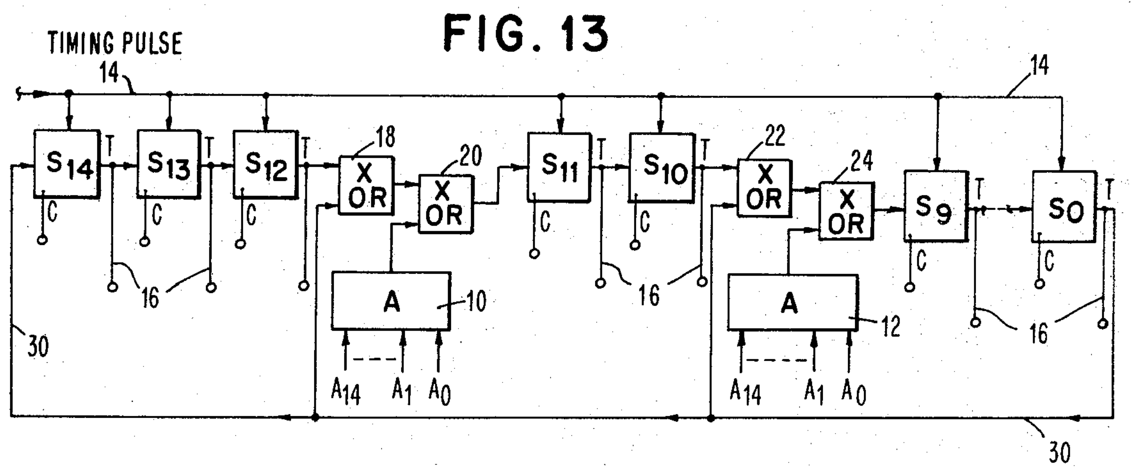
FIG. 13 comprises a logical schematic diagram for a 15-stage shift register counter constructed in accordance with the principles of the present invention.
Figure 14:
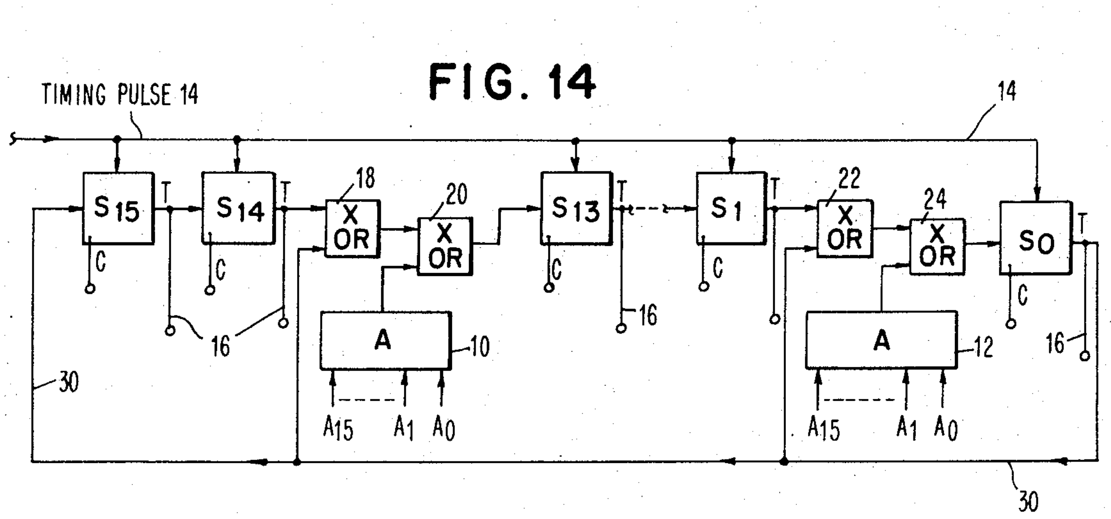
FIG. 14 comprises a logical schematic diagram for a 16-stage shift register counter constructed in accordance with the principles of the present invention.
Figure 15:
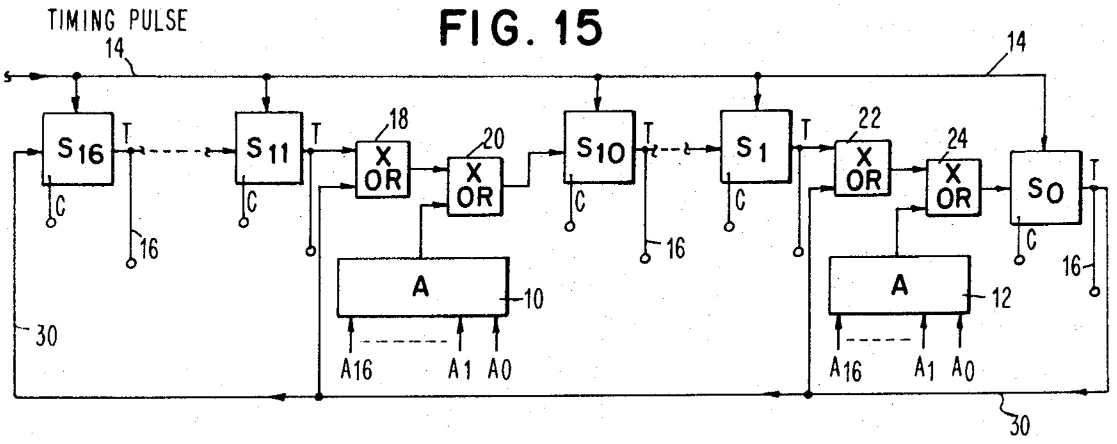
FIG. 15 comprises a logical schematic diagram for a 17-stage shift register counter constructed in accordance with the principles of the present invention.
Figure 16:
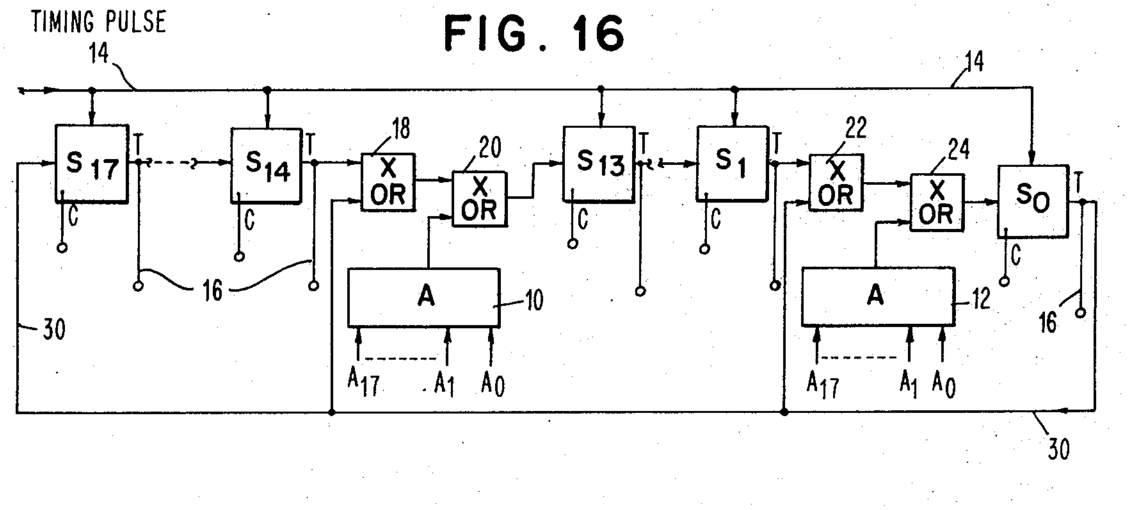
FIG. 16 comprises a logical schematic diagram for an 18-stage shift register counter constructed in accordance with the principles of the present invention.
Figure 17:
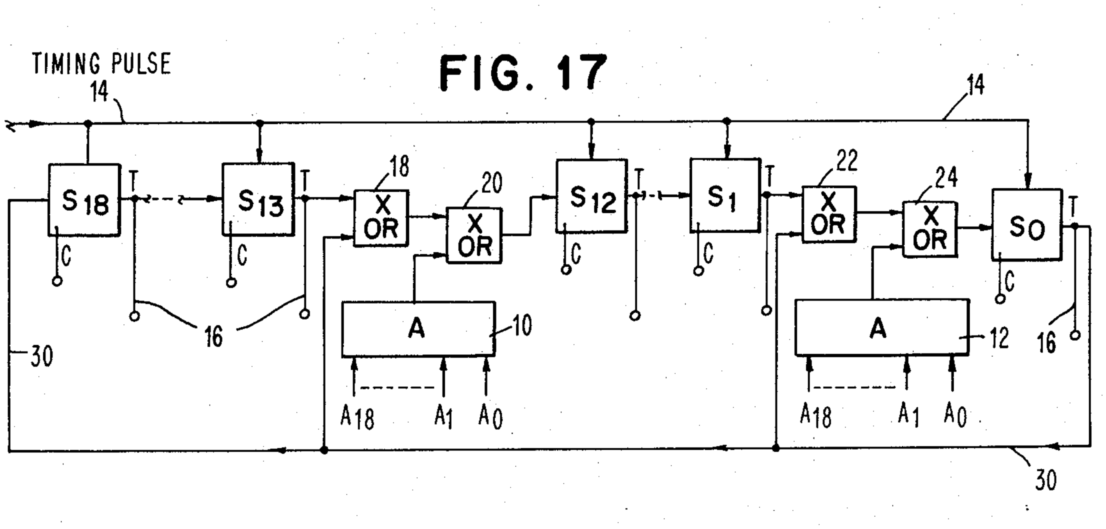
FIG. 17 comprises a logical schematic diagram for a 19-stage shift register counter constructed in accordance with the principles of the present invention.

Reference should now be made to FIG. 11 wherein a counter is disclosed having 13 shift register stages which would normally be utilized where the period J ranges from 2,048–4,094. It will be noted in referring to this FIG., that there are two extra exclusive-OR stages 40 and 42 located between the shift register stages $S_7$ and $S_6$, and $S_6$ and $S_5$. It was determined by the design algorithm that these two exclusive-OR circuits were necessary to produce the proper code patterns for this particular counter configuration. A counter having 13 stages has been synthesized and has been found to operate successfully.

The following Table III indicates the counter designs which have been produced showing the total number of storage elements N in the left-hand column and the range of counts which each form of the counter might be utilized to produce. Connection tables have actually been computed for all of the counts indicated in Table III, and the designed algorithm found to work correctly.

TABLE III

| No. of Storage Elements | periods for which connections Computed |
|---|---|
| 4 | 4–p |
| 5 | 8–14 |
| 6 | 16–30 |
| 7 | 32–62 |
| 8 | 64–126 |
| 9 | 128–254 |
| 10 | 256–305 |
| 11 | 512–547 |
| 12 | 1024–1034 |
| 13 | 2048–2055 |
| 14 | 4096–4101 |
| 15 | 8192–8197 |
| 16 | 16384–16389 |
| 17 | 32768–32773 |
| 18 | 65536–65541 |
| 19 | 131072–131077 |
| 20 | 262144–262149 |

The following description of the shift register counter connection matrix algorithm is intended to explain exactly how this algorithm, which is stated in terms of an APL program, may be utilized to directly produce the connections for the two AND circuits, 10 and 12, in all of the counter configurations disclosed and described herein. Utilizing the disclosed program set forth in Table VI, a circuit designer or technician having minimal programming experience could produce the required connections for any given value of J and parity requirement. The algorithm, as stated in the APL program, is thus in effect a greatly simplified mathematical description of the relationship of the count requirements, the parity and the particular circuit configuration for a given family of such counters. The actual mathematical relationships and formulas utilized in producing the program are exceedingly complex and presenting them herein would not materially add to the comprehension of the invention and would, in all probability, obfuscate same. Thus, the actual manipulative steps and implied branches and loops together with the required listing of variables set forth in Table IV may be directly entered into a machine adapted to run the APL program such as set forth previously.

Table IV, below, sets forth the basic algorithm in a somewhat skeletal form wherein the program is expressed in a quasi-APL type of language. The program statements are shown in the column to the left and the text explanation in the right-hand column generally explains the operations occurring in the program at that particular point. Also, immediately following the table is a brief description of just what is meant by "bitwise" addition of two vectors (mod 2). The letters or characters which are utilized in the program are arbitrary designations for various variables required in the solution process and could be replaced by some other variable designations.

The algorithm for determining the AND gate connections and the initial pattern for a selftesting, completely checked counter of period J will first be explained in English in terms of the general sequence of occurrences. The letters Ⓐ, Ⓑ etc. relate to the Table IV itself.

For each value of $x$, varying from $x$=3 (for $J$–4) to $x$=19 (for $J$=524,286), there correspond three tables, each table with $2^x-1$ entries, so the tables contain 3,145,677 entries. The tables are too bulky to store, but are simple to generate, so the parts required are generated with each use. The algorithm uses these tables, and the indices for entries to these tables, to determine the AND gate connections and the initial patterns.

The basic steps of the algorithm are as follows:

1. Find x such that $2 \leq J < 2^x-1$.
2. Generate the first table, and find the $(2^x-1-J)^{th}$ entry in the table. This step is labeled Ⓐ in the accompanying exact basic algorithm.
3. In the algorithm, the operation + mod 2, bitwise is defined as
   $0+0=0$
   $1+0=1$
   $0+1=1$
   $1+1=0$ and (0,0,1, . . . , 1) + (0,1, 0, . . . , 1) mod 2, bitwise = (0, 1, 1, . . . , 0).

The third step changes the entry found in step 2 by adding (+ mod 2 as defined above) (1, 0, . . . , 0) ($x$–1 0's) to the entry found in step 2 to form P1 — labeled Ⓑ.

4. Look up the table value P1 in the first table and find its index I. (N.B. the table is generated as it is used) — labeled Ⓒ
5. The index I is stored as M1 — labeled Ⓓ
6. The index of the desired table entry is computed as E, (using Table M1,) labeled Ⓕ
7. Odd or even parity as required by the input is chosen, so Table 2 or Table 3 is chosen, labeled Ⓖ
8. The $E^{th}$ table entry is found and — labeled Ⓗ — called PC (the table entries are generated as used). This table entry gives the connections. The basic, exact algorithm follows.

TABLE IV

Algorithm Input: J(period), either 1 for odd parity or 0 for even parity.

Find x such that $2^{x-1} \leq J < 2^x - 1$

| Step | Description |
| --- | --- |
| $J = 2^x - 2$ / $J \neq 2^x - 2$ | Make indicated choice. |
| $K \leftarrow 2^x - 1 - J$ | Set index number K for first table in algorithm. |
| $I \leftarrow 0$<br>$P \leftarrow 1, \overbrace{0, \ldots, 0}^{x-1}$ (x-1 0's)<br>$C \leftarrow 0, M[X-2]$ | set P and C vectors and counter integer I to initial table values for table value generation. Table M is attached. |
| (A) → $P \leftarrow (-1 \phi P) + (P[X] \wedge C)$ mod 2, bitwise | Find table values by shifting P1 place to right, end around and if rightmost bit is a 1, change P values by adding C modulo 2 bitwise. |
| $I \leftarrow I + 1$ | Count table entries. |
| $K \neq I$ (return to A) / $K = I$ | Compute next table value if I <K, if I=K, have found the $K^{th}$ table value. |
| (B) $P1 \leftarrow P + \overbrace{(1, 0, \ldots, 0)}^{x-1}$ mod 2, bitwise | From table value P1 by adding $K^{th}$ table value and (1, 0, ..., 0) modulo 2. |
| $I \leftarrow 0$ | Set counter integer I for second use of first table in algorithm. |
| $P \leftarrow 1, \overbrace{0, \ldots, 0}^{x-1}$<br>$C \leftarrow 0, M[X-2]$ | Set vectors P and C to initial table values for table value generation. |
| (C) → $I \leftarrow I + 1$<br>$P \leftarrow (-1 \phi P) + (P[X] \wedge C)$ mod2, bitwise | Find table values as above. Compare table values with P1 to find index at P1 in table. |
| $P \neq P1$ (return to C) / $P = P1$ | Have found the index (I) for the table value P1. |

TABLE IV - Continued

| | |
|---|---|
| $J=2^x-2$ ; P = P1 | |
| (D) M1 ← I | Save the index of the table value P1. |
| (F) DE ← (M1+IM[X-2])mod($2^x$-1)<br>E ← $2^x$-1-DE | Compute E, the index of the AND gate connections and initial pattern of 0's and 1's in the second table. The values IM are attached. |
| Even Parity / Odd Parity | Make indicated choice of tables depending on parity. |
| (G) PC←Y[X-2] / PC←Z[X-2] | PC is the initial table value for the second table. |
| $J\neq 2^x-2$ | If $J=2^x-2$, the contents of PC give the AND gate connections and the initial pattern of 0's and 1's; if $J\neq 2^x-2$, continue to use second table. |
| R1 ← M[X-2], 1<br>F ← 0,(R1+(1,M[x-2])) mod 2 bitwise | Compute the vectors R1, F for the additive factor for generating the second table. |
| I ← 0 | Set counter integer I to initial value for use with second table. |
| (H) PC ← (-1⌽PC)+(PC[X+1]∧F)mod 2 bitwise | Find table values by shifting vector PC 1 place to right, end around and if rightmost bit is a 1 change PC values by adding vector F mod 2 bitwise. |
| I ← I+1 | Count table entries. |
| I≠E / I=E PC | Compute next table value if I<E. If I=E, PC gives AND gate connections and initial pattern of 1's and 0's. |

```
M[1]  1 0
M[2]  1 0 0
M[3]  0 1 1 1
M[4]  1 0 0 0 0
M[5]  1 1 1 0 0 0
M[6]  1 1 0 0 1 1 1
M[7]  1 0 0 0 1 1 1 1
M[8]  0 0 1 1 1 1 1 1 1
M[9]  1 1 1 1 0 0 0 0 0 1
M[10] 1 0 1 1 1 0 1 1 1 1 1
M[11] 1 1 1 1 1 1 1 1 1 1 1 0
M[12] 1 1 0 0 1 1 1 1 1 1 1 1 1
M[13] 1 0 0 0 0 0 0 0 0 0 0 0 0 0
M[14] 1 1 1 1 1 0 0 0 0 0 0 0 0 0 0
M[15] 1 1 1 0 0 0 0 0 0 0 0 0 0 0 0 0
M[16] 1 1 1 1 1 0 0 0 0 0 0 0 0 0 0 0 0
M[17] 1 1 1 1 1 0 0 0 0 0 0 0 0 0 0 0 0 0
```

Information necessary to generate the tables used in the program.

```
Z[1]  0 1 0 0
Z[2]  1 0 1 0 1
Z[3]  1 0 0 0 0 0
Z[4]  1 0 1 1 1 0 1
Z[5]  0 0 0 1 1 1 0 0
Z[6]  1 1 0 1 0 1 1 1 1
Z[7]  0 1 1 1 0 0 0 0 0 0
Z[8]  0 1 0 1 1 1 1 1 1 1 1
Z[9]  0 0 0 0 1 1 1 1 1 0 0 0
Z[10] 0 1 0 0 0 0 0 0 0 0 0 0 0
Z[11] 0 0 0 0 0 0 0 0 0 0 0 1 0 0
Z[12] 1 1 0 1 0 1 1 1 1 1 1 1 1 1 1
Z[13] 0 1 1 1 1 1 1 1 1 1 1 1 1 1 0 0
Z[14] 1 1 1 1 1 0 1 1 1 1 1 1 1 1 1 0 1
Z[15] 0 0 0 1 1 1 1 1 1 1 1 1 1 1 1 1 0 0
Z[16] 1 1 1 1 1 0 1 1 1 1 1 1 1 1 1 1 1 0 1
Z[17] 0 0 0 0 0 1 1 1 1 1 1 1 1 1 1 1 1 1 0 0
```

Information necessary to generate the tables used in the program.

Y[1] 1 0 0 1

Y[2] 0 1 1 0 0

Y[3] 0 0 1 1 1 1

Y[4] 0 1 1 1 1 0 0

Y[5] 1 1 1 0 1 1 0 1

Y[6] 0 0 1 1 0 0 0 0 0

Y[7] 1 0 1 1 0 1 1 1 1 1

Y[8] 1 1 0 0 0 0 0 0 0 0 0

Y[9] 1 1 1 1 0 1 1 1 1 0 1 1

Y[10] 1 0 0 1 1 1 0 1 1 1 1 1 1

Y[11] 1 1 1 1 1 1 1 1 1 1 1 0 0 1

Y[12] 0 0 1 1 0 0 0 0 0 0 0 0 0 0 0

Y[13] 1 0 1 1 1 1 1 1 1 1 1 1 1 1 0 1

Y[14] 0 0 0 0 0 1 1 1 1 1 1 1 1 1 1 0 0

Y[15] 1 1 1 0 1 1 1 1 1 1 1 1 1 1 1 1 0 1

Y[16] 0 0 0 0 0 1 1 1 1 1 1 1 1 1 1 1 1 0 0

Y[17] 1 1 1 1 1 0 1 1 1 1 1 1 1 1 1 1 1 1 0 1

Information necessary to generate the tables used in the program.

IM = 4, 11, 11, 57, 40, 140, 427, 585, 840, 2878, 2710, 6225, 32725, 6294, 87375, 66334, 100334.

The following Table V illustrates a second level of detent using the basic algorithm written in quasi-APL language. Only the actual steps necessary to produce an answer for the constants J=5 odd parity are shown.

TABLE V

Example: J=5, Odd Parity.

| | |
|---|---|
| x = 3, $\underline{4 < 5 < 7}$ | |
| K ← 2 = 7-5 | |
| I ← 0 | |
| P ← 1, 0, 0<br>C ← 0, 1, 0 | Initialization |
| P ← 0, 1, 0<br>I ← 1 | First Step, I < K since 1 < 2 |
| P ← 0, 0, 1<br>I ← 2 | End step, I=K, since 2=2 |
| P1 ← 1, 0, 1 | Bitwise addition |
| I ← 0<br>P ← 1, 0, 0<br>C ← 0, 1, 0 | Initialization |
| I ← 1<br>P ← 0, 1, 0 | First step, P≠P1 since 0, 1, 0≠1, 0, 1 |
| I ← 2<br>P ← 0, 0, 1 | Second step 0, 0, 1 ≠ 1, 0, 1 |

TABLE V - continued

| | |
|---|---|
| I ← 3<br>100<br>+010<br>P ← 1, 1, 0 | Third step, mod 2 bitwise addition done, 1, 1, 0 ≠ 1, 0, 1 |
| I ← 4<br>P ← 0, 1, 1 | Fourth Step 0, 1, 1 ≠ 1, 0, 1 |
| I ← 5<br>101<br>+010<br>P ← 1, 1, 1 | Fifth step, mod 2 bitwise addition done, 1, 1, 1 ≠ 1, 0, 1 |
| I ← 6<br>111<br>010<br>P ← 101 | Sixth step, mod 2 bitwise addition done<br>Last step, as P=P1 since 1, 0, 1=1, 0, 1 |
| M1 ← 6 | |
| PC ← 0, 1, 0, 0 | Since odd parity is input, initial table value. |
| DE ← 3 = (6+4) mod 7 | |
| E ← 4 = 7-3 | Index in second table is 4. |
| R1 ← 1, 0, 1<br>1,0,1<br>+1,1,0<br>0,1,1<br>F ← 0, 0, 1, 1 | mod 2 bitwise addition shown. |

TABLE V - continued

```
I ← 0

PC ← 0, 0, 1, 0  }    First step  I≠E (1≠4)
I ← 1

PC ← 0, 0, 0, 1  }    Second step, I≠E
I ← 2

    1000
   +0011
PC ←1011         }    Third step, I≠E
I ← 3

    1101
   +0011
PC ←1,1,1,0      }    Fourth and Last step, I=E
I ← 4

PC = 1, 1, 1, 0
```

Initial Pattern = 1, 1, 1, 0

AND Connections $A_3=S_3$, $A_2=S_2$, $A_1=S_1$, $A_0=\overline{S}_0$

The last value of PC=1, 1, 1, 0 is the final answer for the connections to the AND circuits 10 and 12 and also the initial counter input loading. Thus, lines $A_3$, $A_2$, and $A_1$ are to be connected to the true output of the stages $S_3$, $S_2$, and $S_1$ and the fourth place 0 indicates that the line $A_0$ is to be connected to the complement output of stage $S_0$. Also, steps $S_3 \ldots S_0$ are loaded with 1, 1, 1, 0 initially. The algorithm thus works just like a formula and given the required input including the number of stages, the exact count desired, and the parity, the connections and initial loading will be produced by the program by this straightforward evaluation method.

A valid APL program, which computes the results of the algorithm, is attached together with two examples of its use. The steps of the algorithm are shown on the right.

As stated previously, the program has been written to run on an IMB S/360 Model 91 (75,50) computer equipped with the OSS operating system, which has successfully computed the various connections and initializing contents for the shift registers. The program is written in the APL language. A complete description of this language is available in APL/360 USER'S MANUAL.

TABLE VI

```
      ∇ CHKDREG J
[1]   →GD
[2]   BEG:X3←2⍟J[1]                          FIND X
[3]   X←⌈ X3+1
[4]   EX←(2*X)-1                             ⎫
[5]   →A3×⍳(J[1]=EX-1)                       ⎪
[6]   K←EX-J[1]                              ⎪
[7]   P2←1,(X-1)⍴0                           ⎬ A , FIRST TABLE LOOK UP
[8]   P←P2                                   ⎪
[9]   I←0                                    ⎪
[10]  C←0,M[X-2;⍳X-1]                        ⎪
[11]  A1:P←(¯1⌽P)≠(P[X]∧C)                   ⎪
[12]  →A1×⍳(K≠I←I+1)                         ⎭
[13]  P1←P≠(1,(X-1)⍴0)                         B , P1
[14]  P←P2                                   ⎫
[15]  I←0                                    ⎪
[16]  A2:I←I+1                               ⎬ C , SECOND TABLE LOOKUP
[17]  P←(¯1⌽P)≠(P[X]∧C)                      ⎪
[18]  →A2×⍳(∨/P≠P1)                          ⎭
[19]  M1←I                                     D , M1
[20]  DE←EX|IM[X-2]+M1                       } F , CALCULATE INDEX
[21]  E←EX-DE
[22]  A3:R1←M[X-2;⍳X-1],1                    ⎫
[23]  F←0,R1≠(1,M[X-2;⍳X-1])                 ⎪
[24]  →B1×⍳(J[2]≠1)                          ⎪
[25]  PC←Z[X-2;⍳X+1]                         ⎪
[26]  B3:→A7×⍳(J[1]=EX-1)                    ⎬ G , PICK ODD OR EVEN PARITY
[27]  I←0                                    ⎪         TABLE
[28]  →A6                                    ⎪
[29]  B1:PC←Y[X-2;⍳X+1]                      ⎪
[30]  →B3                                    ⎭
[31]  A6:PC←(¯1⌽PC)≠(PC[X+1]∧F)                H , THIRD TABLE LOOKUP
[32]  →A6×⍳(E≠I←I+1 )                              PRINT RESULT
[33]  A7:"THE AND GATE CONNECTIONS
      ARE GIVEN BY                                  ';PC
[34]  →0
[35]  GD:M←17 20 ⍴0                          ⎫
[36]  M[1;]←1,19⍴0                           ⎪
[37]  M[2;]←1,19⍴0                           ⎪
[38]  M[3;]←0 1 1 1 ,16⍴0                    ⎪
[39]  M[4;]←1,19⍴0                           ⎪
[40]  M[5;]← 1 1 1 ,17⍴0                     ⎪
[41]  M[6;]← 1 1 0 0 1 1 1 ,13⍴0             ⎪
[42]  M[7;]← 1 0 0 0 1 1 1 1 ,12⍴0           ⎬ BASIS FOR FIRST 17 TABLES
[43]  M[8;]← 0 0 1 1 1 1 1 1 1 ,11⍴0         ⎪
[44]  M[9;]← 1 1 1 1 0 0 0 0 0 1 ,10⍴0       ⎪
[45]  M[10;]← 1 0 1 1 1 0 1 1 1 1 1 ,9⍴0     ⎪
[46]  M[11;]←(11⍴1),9⍴0                      ⎪
[47]  M[12;]← 1 1 0 0 ,(9⍴1),7⍴0             ⎪
[48]  M[13;]←1,19⍴0                          ⎪
[49]  M[14;]← 1 1 1 1 1 ,15⍴0                ⎪
[50]  M[15;]← 1 1 1 ,17⍴0                    ⎪
[51]  M[16;]← 1 1 1 1 1 ,15⍴0                ⎪
[52]  M[17;]← 1 1 1 1 1 ,15⍴0                ⎭
```

TABLE VI - continued

```
[53]  Z← 17 20 ρ0
[54]  Z[1;]← 0 1 ,18ρ0
[55]  Z[2;]← 1 0 1 0 1 ,15ρ0
[56]  Z[3;]←1,19ρ0
[57]  Z[4;]← 1 0 1 1 1 0 1 ,13ρ0
[58]  Z[5;]← 0 0 0 1 1 1 ,14ρ0
[59]  Z[6;]← 1 1 0 1 0 1 1 1 1 ,11ρ0
[60]  Z[7;]← 0 1 1 1 ,16ρ0
[61]  Z[8;]← 0 1 0 ,(8ρ1),9ρ0               } BASIS FOR ODD PARITY TABLES
[62]  Z[9;]← 0 0 0 0 1 1 1 1 1 ,11ρ0
[63]  Z[10;]← 0 1 ,18ρ0
[64]  Z[11;]← (11ρ0),1,8ρ0
[65]  Z[12;]← 1 1 0 1 0 ,(10ρ1),5ρ0
[66]  Z[13;]←0,(13ρ1),6ρ0
[67]  Z[14;]←(5ρ1),0,(9ρ1), 0 1 ,3ρ0
[68]  Z[15;]← 0 0 0 ,(13ρ1),4ρ0
[69]  Z[16;]←(5ρ1),0,(11ρ1), 0 1 0
[70]  Z[17;]←(5ρ0),(13ρ1), 0 0
[71]  Y← 17 20 ρ0
[72]  Y[1;]← 1 0 0 1 ,16ρ0
[73]  Y[2;]← 0 1 1 ,17ρ0
[74]  Y[3;]← 0 0 1 1 1 1 ,14ρ0
[75]  Y[4;]← 0 1 1 1 1 ,15ρ0
[76]  Y[5;]← 1 1 1 0 1 1 0 1 ,12ρ0
[77]  Y[6;]← 0 0 1 1 ,16ρ0
[78]  Y[7;]← 1 0 1 1 0 ,(5ρ1),10ρ0
[79]  Y[8;]← 1 1 ,18ρ0                      } BASIS FOR EVEN PARITY TABLES
[80]  Y[9;]←(4ρ1),0,(4ρ1), 0 1 1 ,8ρ0
[81]  Y[10;]← 1 0 0 1 1 1 0 ,(6ρ1),7ρ0
[82]  Y[11;]←(11ρ1), 0 0 1 ,6ρ0
[83]  Y[12;]← 0 0 1 1 ,16ρ0
[84]  Y[13;]← 1 0 ,(12ρ1), 0 1 ,4ρ0
[85]  Y[14;]←(5ρ0),(10ρ1),5ρ0
[86]  Y[15;]← 1 1 1 0 ,(12ρ1), 0 1 0 0
[87]  Y[16;]←(5ρ0),(12ρ1), 0 0 0
[88]  Y[17;]←(5ρ1),0,(12ρ1), 0 1
[89]  IM← 4 11 11 57 40 140 427 585 840 2878 2710   } E INDEX
          6225 32752 6294 87375 66334 100334         } CALCULATIONS
[90]  →BEG
    ∇

      CHKDREG 5,1
THE AND GATE CONNECTIONS ARE GIVEN BY     1 1 1 0 }
      CHKDREG 6,0                                  } EXAMPLES
THE AND GATE CONNECTIONS ARE GIVEN BY     1 0 0 1 }
```

The above Tables IV and V, generally, describe the operations carried out in the present program. The following Table VI is a complete statement of the actual program as it would be run on a machine. Step 1 is an initializing step as will be understood by an APL programmer, it should be understood that a number of detail steps have been deleted which are essentially print formatting instructions and which specify that the output be printed out in a particular columnar or tabular form. However, a programmer with minimal experience can provide any format desired. The program shown in Table VI produced the outputs shown in the two examples at the bottom of the table. It will thus be seen that upon initialization of the program when entering it into a machine, it is necessary to provide only the value of the count period J and the parity desired. Upon entering this information and typing in the rest of the program as specified in Table V, the input connections to the two AND circuits will automatically be provided. It will also be noted that the automatic loading of the shift register for the first time period is also implied by this very same designation. It should be further clearly understood that by utilizing this algorithmic solution or program, no discretionary steps are required of the programmer, technician, or other person actually attempting to design the particular counter.

There has thus been disclosed and described a novel and highly versatile set of shift register counters having a fixed parity built in. The resultant counter structure is also unique in that it is automatically self testing. That is, if any single element of the counter fails which would cause an error in the output, this error will be made apparent immediately by the failure of the counter output to be at said fixed parity.

The application of such counters in computer systems and/or various other electronic applications, especially where the self testing and parity feature is desirable, is thought to be very wide. The counters are very simple and straight-forward in construction and require a minimum of logic circuitry.

While a specific single count counter has been indicated as a preferred embodiment of the invention, it is possible that utilizing the teachings of the present invention, a counter configuration could be utilized having a connection matrix whereby the count capability for a given counter having a fixed number of stages could be varied utilizing either plug board techniques or some other more complex switching mechanism. However, in this latter case, the basic teachings of the present invention and the actual selection of the inputs for the AND circuits would be exactly the same as disclosed herein.

While the invention has been particularly shown and described with reference to preferred embodiments thereof, it will be understood by those skilled in the art that various changes in form and details may be made therein without departing from the spirit and scope of the invention.

What is claimed is:

1. A self-testing fixed parity shift register counter having no fixed parity bit, said counter being comprised of four individual shift register stages $S_0$ to $S_3$ adaptable for counting to a number J selectable from $2^2$ to $2^3-2$, said stages being interconnected so that the output of any given stage $S_i$ becomes the input of the adjacent lower-order stage ($S_{i-1}$) and wherein the output of a lowest-order stage, $S_0$, provides an input to the highest-order stage, $S_3$, a first logic circuit means interposed between stage $S_2$ and stage $S_1$ and a second logic circuit means interposed between stage $S_1$ and stage $S_0$, both said logic circuit means including in each case two, two input exclusive-OR circuits and a four input AND gate, the outputs of stage $S_2$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_1$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the four counter stages, each input from each stage being selected from the true and complement output of that stage.

2. A self-testing fixed parity shift register counter having no fixed parity bit, said counter being comprised of five individual shift register stages $S_0$ to $S_4$ adaptable for counting to a number J selectable from $2^3$ to $2^4-2$, said stages being interconnected so that the output of any given stage $S_i$ becomes the input of the adjacent lower-order stage ($S_{i-1}$) and wherein the output of a lowest-order stage, $S_0$, provides an input to the highest-order stage, $S_4$, a first logic circuit means interposed between stage $S_3$ and stage $S_2$ and a second logic circuit means interposed between stage $S_1$ and stage $S_0$, both said logic circuit means including in each case two, two input exclusive-OR circuits and a five input AND gate, the outputs of stage $S_3$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_2$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the five counter stages, each input from each stage being selected from the true and complement output of that stage.

3. A self-testing fixed parity shift register counter having no fixed parity bit, said counter being comprised of six individual shift register stages $S_0$ to $S_5$ adaptable for counting to a number J selectable from $2^4$ to $2^5-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_5$, a first logic circuit means interposed between stage $S_5$ and stage $S_4$ and a second logic circuit means interposed between stage $S_4$ and stage $S_3$, both said logic circuit means including in each case two, two input exclusive-OR circuits and a six input AND gate, the outputs of stage $S_5$ and the lowest-order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_4$, the outputs of stage $S_4$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_3$, the inputs to the two AND circuits in said two logic circuit means being identical and being obtained from each of the six counter stages, each input from each stage being selected from the true and complement output of that stage.

4. A self-testing fixed parity shift register counter having no fixed parity bit, said counter being comprised of seven individual shift register stages $S_0$ to $S_6$ adaptable for counting to a number J selectable from $2^5$ to $2^6 -2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_6$, a first logic circuit means interposed between stage $S_5$ and stage $S_4$ and a second logic circuit means interposed between stage $S_1$ and stage $S_0$, both said logic circuit means including in each case two, two input exclusive-OR circuits and a seven input AND gate, the outputs of stage $S_5$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_4$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the seven counter stages, each input from each stage being selected from the true and complement output of that stage.

5. A self-testing fixed parity shift register counter having no fixed parity bit, said counter being comprised of eight individual shift register stages $S_0$ to $S_6$ adaptable for counting to a number J selectable from $2^6$ to $2^7 -2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_7$, a first logic circuit means interposed between stage $S_4$ and stage $S_3$ and a second logic circuit means interposed between stage $S_1$ and stage $S_0$, both said logic circuit means including in each case two, two input exclusive-OR circuits and an eight input AND gate, the outputs of stage $S_4$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_3$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, add the output of the second exclusive-OR circuit providing the input to stage $S_0$, the inputs to the two AND circuits in said two logic circuit means being identical and being obtained from each of the eight counter stages, each input from each stage being selected from the true and complement output of that stage.

6. A self-testing fixed parity shift register counter having no fixed parity bit, said counter being comprised of nine individual shift register stages $S_0$ to $S_8$ adaptable for counting to a number J selectable from $2^7$ to $2^8 -2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_8$, a first logic circuit means interposed between stage $S_6$ and stage $S_5$ and a second logic circuit means interposed between stage $S_4$ and stage $S_3$, both said logic circuit means including in each case two, two input exclusive-OR circuits and a nine input AND gate, the outputs of stage $S_6$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_5$, the outputs of stage $S_4$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_3$, the inputs to the two AND circuits in said two logic circuit means being identical and being obtained from each of the nine counter stages, each input from each stage being selected from the true and complement output of that stage.

7. A self-testing fixed parity shift register counter having no fixed parity bit, said counter being comprised of 10 individual shift register stages $S_0$ to $S_9$ adaptable for counting to a number J selectable from $2^8$ to $2^9 -2$, said stages being interconnected so that the output of any given stage $S_i$ becomes the input of the adjacent lower-order stage ($S_{i-1}$) and wherein the output of a lowest-order stage $S_0$, provides an input to the highest-order stage $S_9$, a first logic circuit means interposed between stage $S_8$ and stage $S_7$ and a second logic circuit means interposed between stage $S_5$ and stage $S_4$, both said logic circuit means including in each case two, two input exclusive-OR circuits and a ten input AND gate, the outputs of stage $S_8$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_7$, the outputs of stage $S_5$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_4$, the inputs to the two AND circuits in said two logic circuit means being identical and being obtained from each of the 10 counter stages, each input from each stage being selected from the true and complement output of that stage.

8. A self-testing fixed parity shift register counter having no fixed parity bit, said counter being comprised of 11 individual shift register stages $S_0$ to $S_{10}$ adaptable for counting to a number J selectable from $2^9$ to $2^{10}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{10}$, a first logic circuit means interposed between stage $S_{10}$ and stage $S_9$ and a second logic circuit means interposed between stage $S_8$ and stage $S_7$, both said logic circuit means including in each case two, two input exclusive-OR circuits and an 11 input AND gate, the outputs of stage $S_{10}$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_9$, the outputs of stage $S_8$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_7$, the inputs to the two AND circuits in said two logic circuit means being identical and being obtained from each of the 11 counter stages, each input from each stage being selected from the true and complement output of that stage.

9. A self-testing fixed parity shift register counter having no fixed parity bit, said counter being comprised of 12 individual shift register stages $S_0$ to $S_{11}$ adaptable for counting to a number J selectable from $2^{10}$ to $2^{11}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{11}$, a first logic circuit means interposed between stage $S_7$ and stage $S_6$ and a second logic circuit means interposed between stage $S_2$ and stage $S_1$, both said logic circuit means including in each case two, two input exclusive-OR circuits and a 12 input AND gate, the outputs of stage $S_7$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_6$, the outputs of stage $S_2$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_1$, the inputs to the two AND circuits in said two logic circuit means being identical and being obtained from each of the 12 counter stages, each input from each stage being selected from the true and complement output of that stage.

10. A self-testing fixed parity shift register counter having no fixed parity bit, said counter being comprised of 13 individual shift register stages $S_0$ to $S_{12}$ adaptable for counting to a number J selectable from $2^{11}$ to $2^{12}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{12}$, a first logic circuit means interposed between stage $S_{11}$ and stage $S_{10}$ and a second logic circuit means interposed between stage $S_{10}$ and stage $S_9$, both said logic circuit means including in each case two, two input exclusive-OR circuit and a 13 input AND gate, a fifth exclusive-OR circuit connected directly between stage $S_7$ and stage $S_6$ and a sixth exclusive-OR circuit connected directly between stage $S_6$ and stage $S_5$, the outputs of stage $S_{11}$ and the lowest-order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_{10}$, the outputs of stage $S_{10}$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_9$, the outputs of stage $S_7$ and the lowest-order stage $S_0$ providing the two inputs to the fifth exclusive-OR, and the output of the fifth exclusive-OR providing the input to stage $S_6$, the outputs of stage $S_6$ and the lowest-order stage $S_0$ providing the two inputs to the sixth exclusive-OR and the output of the sixth exclusive-OR providing the input to stage $S_5$, the inputs to the two AND circuits in said two logic circuit means being identical and being obtained from each of the 13 counter stages, each input from each stage being selected from the true and complement output of that stage.

11. A self-testing fixed parity shift register counter having no fixed parity bit, said counter being comprised of 14 individual shift register stages $S_0$ to $S_{13}$ adaptable for counting to a number J selectable from $2^{12}$ to $2^{13}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{13}$, a first logic circuit means interposed between stage $S_2$ and stage $S_1$ and a second logic circuit means interposed between stage $S_1$ and stage $S_0$, both said logic circuit means including in each case two, two input exclusive-OR circuits and a 14 input AND gate, the outputs of stage $S_2$ and the lowest-order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_1$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the 14 counter stages, each input from each stage being selected from the true and complement output of that stage.

12. A self-testing fixed parity shift register counter having no fixed parity bit, said counter being comprised of 15 individual shift register stages $S_0$ to $S_{14}$ adaptable for counting to a number J selectable from $2^{13}$ to $2^{14}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{14}$, a first logic circuit means interposed between stage $S_{12}$ and stage $S_{11}$ and a second logic circuit means interposed between stage $S_{10}$ and stage $S_9$, both said logic circuit means including in each case two, two input exclusive-OR circuits and a 15 input AND gate, the outputs of stage $S_{12}$ and the lowest-order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_{11}$, the outputs of stage $S_{10}$ and the lowest-order stage providing the two inputs to the first exclusive-OR circuit of the second logic circuit means and the output of the first exclusive-OR circuit and the output of the AND circuit providing the input to the second exclusive-OR circuit and the output of the second exclusive-OR circuit providing the input to stage $S_9$, the inputs to the two AND circuits in said two logic circuit means being identical and being obtained from each of the 15 counter stages, each input from each stage being selected from the true and complement output of that stage.

13. A self-testing fixed parity shift register counter having no fixed parity bit, said counter being comprised of 16 individual shift register stages $S_0$ to $S_{15}$ adaptable for counting to a number J selectable from $2^{14}$ to $2^{15}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{15}$, a first logic circuit means interposed between stage $S_{14}$ and stage $S_{13}$ and a second logic circuit means interposed between stage $S_1$ and stage $S_0$, both said logic circuit means including in each case two, two input exclusive-OR circuits and a 16 input AND gate, the outputs of stage $S_{14}$ and the lowest-order stage providing the two inputs to the first exclusive-oR circuit of the first logic circuit means and the output of the first exclusive-OR circuit and the output of said AND gate providing the input to the second exclusive-OR circuit and the output of the second exclusive-OR circuit providing the input to stage $S_{13}$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the 16 counter stages, each input from each stage being selected from the true and complement output of that stage.

14. A self-testing fixed parity shift register counter having no fixed parity bit, said counter being comprised of 17 individual shift register stages $S_0$ to $S_{16}$ adaptable for counting to a number J selectable from $2^{15}$ to $2^{16}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage, $S_{16}$, a first logic circuit means interposed between stage $S_{11}$ and stage $S_{10}$ and a second logic circuit means interposed between stage $S_1$ and stage $S_0$, both said logic circuit means including in each case two, two input exclusive-OR circuits and 17 input AND gate, the outputs of stage $S_{11}$ and the lowest-order stage providing the two inputs to the first exclusive-OR circuit of the first logic-circuit means and the output of the first exclusive-OR circuit and the output of said AND gate providing the input to the second exclusive-OR circuit and the output of the second exclusive-OR circuit providing the input to stage $S_{10}$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the 17 counter stages, each input from each stage being selected from the true and complement output of that stage.

15. A self-testing fixed parity shift register counter having no fixed parity bit, said counter being comprised of 18 individual shift register stages $S_0$ to $S_{17}$ adaptable for counting to a number J selectable from $2^{16}$ to $2^{17}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage, $S_{17}$ a first logic circuit means interposed between stage $S_{14}$ and stage $S_{13}$ and a second logic circuit means interposed between stage $S_1$ and stage $S_0$, both said logic circuit means including in each case two, two input exclusive-OR circuits and an 18 input AND gate, the outputs of stage $S_{14}$ and the lowest-Order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_{13}$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the 18 counter stages, each input from each stage being selected from the true and complement output of that stage.

16. A self-testing fixed parity shift register counter having no fixed parity bit, said counter being comprised of 19 individual shift register stages $S_0$ to $S_{18}$ adaptable for counting to a number J selectable from $2^{17}$ to $2^{18}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{18}$, a first logic circuit means interposed between stage $S_{13}$ and stage $S_{12}$ and a second logic circuit means interposed between stage $S_1$ and stage $S_0$, both said logic circuit means including in each case two, two input exclusive-OR circuits and a 19 input AND gate, the outputs of stage $S_{13}$ and the lowest-order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_{12}$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the 19 counter stages, each input from each stage being selected from the true and complement output of that stage.

17. A self-testing fixed parity shift register counter having no fixed parity bit, said counter being comprised of 20 individual shift register stages $S_0$ to $S_{19}$ adaptable for counting to a number J selectable from $2^{18}$ to $2^{19}-2$, said stages being interconnected so that the output of any given stage $S_i$ becomes the input of the adjacent lower-order stage ($S_{i-1}$) and wherein the output of a lowest-order stage, $S_0$, provides an input to the highest-order stage $S_{19}$, a first logic circuit means interposed between stage $S_{14}$ and stage $S_{13}$ and a second logic circuit means interposed between stage $S_1$ and stage $S_0$, both said logic circuit means including in each case two, two input exclusive-OR circuits and a 20 input AND gate, the outputs of stage $S_{14}$ and the lowest-order stage providing the two inputs to the first exclusive-OR circuit of the first logic circuit means and the output of the first exclusive-OR circuit and the output of said AND gate providing the input to the second exclusive-OR circuit and the output of the second exclusive-OR circuit providing the input to stage $S_{13}$, the outputs of stage $S_1$ and the lowest-order stage providing the two inputs to the first exclusive-OR circuit of the second logic circuit means and the output of the first exclusive-OR circuit and the output of the AND circuit providing the input to the second exclusive-OR circuit, and the output of the second exclusive-OR circuit providing the input to stage $S_0$, the inputs to the two AND circuits in said two logic circuit means being identical and being obtained from each of the 19 counter stages, each input from each stage being selected from the true and complement output of that stage.

* * * * *